(12) United States Patent
Minami et al.

(10) Patent No.: US 8,023,980 B2
(45) Date of Patent: Sep. 20, 2011

(54) PHONE TERMINAL, SERVER, AND TALKING SYSTEM HAVING PHONE TERMINALS AND THE SERVER

(75) Inventors: Takuo Minami, Kanagawa (JP); Takefumi Matsui, Kanagawa (JP)

(73) Assignee: Panasonic Corporation, Osaka (JP)

( * ) Notice: Subject to any disclaimer, the term of this patent is extended or adjusted under 35 U.S.C. 154(b) by 914 days.

(21) Appl. No.: 11/994,875

(22) PCT Filed: Jul. 12, 2006

(86) PCT No.: PCT/JP2006/313899
§ 371 (c)(1),
(2), (4) Date: Jan. 7, 2008

(87) PCT Pub. No.: WO2007/007806
PCT Pub. Date: Jan. 18, 2007

(65) Prior Publication Data
US 2009/0124237 A1    May 14, 2009

(30) Foreign Application Priority Data
Jul. 13, 2005  (JP) .................................. 2005-204584

(51) Int. Cl.
*H04B 7/00* (2006.01)
*H04L 12/58* (2006.01)
(52) U.S. Cl. ......... 455/518; 455/412; 455/519; 455/517
(58) Field of Classification Search ............... 455/412, 455/412.1, 517–519
See application file for complete search history.

(56) References Cited

U.S. PATENT DOCUMENTS

| 7,415,284 | B2 * | 8/2008 | Hoover et al. ............. 455/518 |
| 2005/0032539 | A1 | 2/2005 | Noel et al. |
| 2006/0212526 | A1 * | 9/2006 | Subramanian et al. ....... 709/206 |
| 2007/0016828 | A1 * | 1/2007 | Luo et al. ..................... 714/38 |

FOREIGN PATENT DOCUMENTS

| EP | 1 847 094 A1 | 8/2006 |
| WO | 99-22466 | 5/1999 |
| WO | 02-093954 | 11/2002 |
| WO | 03-036801 | 5/2003 |
| WO | 2005/043944 A1 | 5/2005 |

OTHER PUBLICATIONS

"Universal Mobile Telecommunication System (UMTS); 3GPP enablers for Open Mobile Alliance (OMA) Push-to-talk over Cellular (PoC) services; Stage 2 (3GPP TR 23.979 version 6.1.0 Release 6); ETSI TR 123 979" ETSI Standards, vol. 3-SA2, No. V6.1.0. Mar. 1, 2005. European Search Report, Nov. 2, 2009.
"Push-to-talk over Cellular (PoC)"; Architecture; PoC Release 2.0, Jun. 8, 2004.
International Search Report dated Aug. 15, 2006.

* cited by examiner

*Primary Examiner* — Kamran Afshar
*Assistant Examiner* — Omoniyi Obayanju
(74) *Attorney, Agent, or Firm* — Pearne & Gordon LLP

(57) ABSTRACT

The present invention aims at providing a phone terminal over which the user who is attending the PoC talking can talk at a desired timing, a server, and a talking system having the phone terminals and the server. A talking system of the present invention is constructed such that a cellular phone A 10a transmits voice data to a server 20 while a floor is not granted by the server 20, and the server 20 has a storing portion for storing the voice data from a cellular phone to which the floor is not granted and transmits voice data read from the storing portion to a cellular phone B 10b after the cellular phone B 10b released the floor.

9 Claims, 16 Drawing Sheets

FIG. 13 (a)

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|V=2|P|0 0 0 0 0|   PT=APP=204  |           length=2            |
+-+-+-+-+-+-+-+-+-+-+-+-+-+-+-+-+-+-+-+-+-+-+-+-+-+-+-+-+-+-+-+-+
|                          SSRC of UE                           |
+-+-+-+-+-+-+-+-+-+-+-+-+-+-+-+-+-+-+-+-+-+-+-+-+-+-+-+-+-+-+-+-+
|                           name=PoC1                           |
+-+-+-+-+-+-+-+-+-+-+-+-+-+-+-+-+-+-+-+-+-+-+-+-+-+-+-+-+-+-+-+-+
|                          Request code                         |
+-+-+-+-+-+-+-+-+-+-+-+-+-+-+-+-+-+-+-+-+-+-+-+-+-+-+-+-+-+-+-+-+
```

FIG. 13 (b)

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|V=2|P|0 0 0 1 0|   PT=APP=204  |           length=2            |
+-+-+-+-+-+-+-+-+-+-+-+-+-+-+-+-+-+-+-+-+-+-+-+-+-+-+-+-+-+-+-+-+
|                          SSRC of UE                           |
+-+-+-+-+-+-+-+-+-+-+-+-+-+-+-+-+-+-+-+-+-+-+-+-+-+-+-+-+-+-+-+-+
|                           name=PoC1                           |
+-+-+-+-+-+-+-+-+-+-+-+-+-+-+-+-+-+-+-+-+-+-+-+-+-+-+-+-+-+-+-+-+
| Reason code |    Length     |         Reason Phrase         |
+-+-+-+-+-+-+-+-+-+-+-+-+-+-+-+-+                               :
:                                                               :
+-+-+-+-+-+-+-+-+-+-+-+-+-+-+-+-+-+-+-+-+-+-+-+-+-+-+-+-+-+-+-+-+
```

PHONE TERMINAL, SERVER, AND TALKING SYSTEM HAVING PHONE TERMINALS AND THE SERVER

TECHNICAL FIELD

The present invention relates to a phone terminal for conducting a taking by utilizing PoC (Push-to-Talk over Cellular) as a function by which speakers exchange a voice alternately, a server utilized in a PoC talking, and a talking system having the phone terminals and the server.

BACKGROUND ART

Like the transceiver or the radio set for business use, a terminal having a function (PTT: Push-to-talk) of exchanging a voice alternately between a plurality of speakers in such a manner that the speaker can talk while pushing a talking button provided to the terminal and can listen the talking contents of other speaker output by a voice while releasing the talking button is widely used nowadays. Unlike the terminal utilizing the telephone line that allows basically the talking between two persons, the terminal utilizing this PTT function is often employed in a situation that the user has simultaneously a communication with plural persons since such terminal permits easily three persons or more to talk together.

It is the technology called PoC (Push-to-Talk over Cellular) that implements this PTT function by the cellular phone. The cellular phone utilizing the PoC function can be used to do a PoC talking by selecting a person the user talks to on the phone from a phone book and then pushing/releasing a particular button provided to the cellular phone like the transceiver or the radio set for business use, for example. Since the cellular phone utilizing the PoC function does not need a dialing process executed when the terminal utilizing the telephone line starts the talking, it can shorten a time required until the talking is started. Processes in the cellular phone utilizing the PoC function (referred simply to as the "cellular phone" hereinafter) and the server utilized in this PoC talking (referred simply to as the "server" hereinafter) will be explained concretely hereunder.

An example of a sequence in a system constructed by cellular phones and a server in the prior art is shown in FIG. 16. In FIG. 16, the situation that the PoC talking is done between a cellular phone A owned by a user A and a cellular phone B owned by a user B is supposed.

The most important scheme in the PoC talking process between the cellular phones and the server is that the server can manage the right that grants a particular cellular phone to talk (called the floor) and the cellular phone to which the floor is granted can do the talking. This scheme is explained with reference to FIG. 16 hereunder. First, when the user B executes the operations (e.g., selects the user A as the person on the other end from the phone book and pushes the particular button) to start the PoC talking with the user A by the cellular phone B, the cellular phone B requests the server to grant the floor (step S1601). Then, when the server is informed from the cellular phone B that the PoC talking is started between the cellular phone A and the cellular phone B, such server transmits a signal to grant the floor to the cellular phone B (step S1602). Then, the server stores a status of the floor indicating the "Floor Grant". When the cellular phone B gets the floor from the server, the user B can start the talking and can continue to talk while the particular button is pushed (a period of time encircled by a dotted line after step S1602).

In contrast, when the cellular phone A that received the start of the PoC talking from the cellular phone B accepts the operation (pushing the particular button) from the user A to talk with the user B, such cellular phone A requests the server to grant the floor (steps S1603, S1605). At this time, when the server is requested from the cellular phone A to grant the floor during a period of time a status of the floor is the "Floor Grant", such server transmits a signal informing that "the floor cannot be granted" to the cellular phone A (steps S1604, S1606). As a result, even when the user A pushes the particular button, such user A cannot talk while the cellular phone A fails to get the floor from the server (a period of time the floor is granted to the cellular phone B). Then, the cellular phone B releases the floor (step S1607), and then the cellular phone A requests the server to grant the floor (step S1608). Then, the server grants the floor to the cellular phone A (step S1609).

Also, another example of the sequence in the system constructed by cellular phones and a server in the prior art is shown in FIG. 17. In FIG. 17, the situation that the PoC talking is done between cellular phones A, B, C owned by three persons of users A, B, C respectively is supposed.

First, the user B executes the operation (e.g., selects the users A, C as the person on the other end from the phone book and pushes the particular button) by the cellular phone B to start the PoC talking with the users A, C. The subsequent processes of the cellular phone B and the server required until the user B starts the talking are identical to the processes of the cellular phone B and the server in the explanation in FIG. 16.

When the user B executes the operation (releases the particular button) by the cellular phone B to end the PoC talking after the user B ended the talking, the cellular phone B informs the server that the floor is released (step S1701). When the server is informed from the cellular phone B that the floor is released, such server updates the "Floor Grant" to a status of the floor indicating the "Floor Idle".

Then, the user C executes the operation (push the particular button) by the cellular phone C to start the PoC talking with the users A, B, and the cellular phone C requests the server to grant the floor (step S1702). Then, since a current status of the floor is the "Floor Idle", the server transmits a signal to grant the floor to the cellular phone C (step S1703). Then, the server updates a status of the floor to the "Floor Grant".

Subsequently, the server repeats three processes given as following.

(1) When the server is requested by another cellular phone to grant the floor during a period of time a status of the floor is the "Floor Grant", such server transmits the signal to another cellular phone to inform that the floor cannot be granted.

(2) When the server is informed from a particular cellular phone that such phone releases the floor (steps S1701, S1704, S1707), such server updates the "Floor Grant" to a status of the floor indicating the "Floor Idle".

(3) When the server is requested by the cellular phone to grant the floor during a period of time a status of the floor is the "Floor Idle" (steps S1702, S1705), such server transmits the signal to grant the floor to the cellular phone (steps S1703, S1706). Then, the server updates a status of the floor to the "Floor Grant".

Non Patent Literature 1: Push-to-Talk over Cellular (PoC)-Archtecture-2.0.8, page 6

DISCLOSURE OF THE INVENTION

Problems that the Invention is to Solve

According to the above cellular phone, the speaker can talk only in a period in which the floor is granted to the speaker. Therefore, the user of the cellular phone cannot always talk at a desired timing. Such situation becomes more conspicuous as the number of users who attend one PoC talking is increased much more.

The present invention has been made in view of the above circumstances, and it is an object of the present invention to provide a phone terminal over which the user who is attending the PoC talking can talk at a desired timing, a server, and a talking system having the phone terminals and the server.

Means for Solving the Problems

A server of the present invention for managing a talking between a plurality of phone terminals, includes a floor managing portion for granting a floor to any one of the phone terminals; a server receiving portion for receiving voice data from the phone terminal; a storing portion for storing the voice data, which is sent from the phone terminal to which the floor is not granted by the floor managing portion, out of the voice data received by the server receiving portion; and a server transmitting portion for transmitting the voice data received by the server receiving portion or the voice data stored in the storing portion to the phone terminal; wherein the server transmitting portion transmits the voice data received by the phone terminal to the phone terminal to which the floor is not granted when the floor managing portion granted the floor to any of the phone terminals, and transmits the voice data stored in the storing portion to the phone terminal when the floor managing portion granted the floor to none of the phone terminals.

A phone terminal of the present invention for doing a talking by utilizing a server that grants a floor, includes a floor acquiring portion for acquiring the floor from the server; a phone terminal transmitting portion for transmitting voice data to the server; and a phone terminal receiving portion for receiving the voice data from the server while the phone terminal does not acquire the floor; wherein the phone terminal transmitting portion transmits the voice data to the server in accordance with a first operation while the phone terminal acquires the floor, and transmits the voice data to the server in accordance with a second operation while the phone terminal does not acquire the floor.

A talking system of the present invention includes the server of the present invention and the phone terminal of the present invention.

A talking method of the present invention using a server that is able to grant a floor to any one of a plurality of phone terminals, includes a voice data receiving step of receiving voice data from the phone terminal; a voice data storing step of storing the voice data, which is sent from the phone terminal to which the floor is not granted, out of the voice data received by the voice data receiving step; and a voice data transmitting step of transmitting the voice data received by the phone terminal to the phone terminal to which the floor is not granted when the floor is granted to any of the phone terminals, and transmitting the voice data stored in the voice data storing step to the phone terminal when the floor is granted to none of the phone terminals.

According to this configuration, the user who is attending the PoC talking can talk at a desired timing.

Also, in the server of the present invention, when the floor managing portion grants the floor to none of the phone terminals, the server transmitting portion transmits the voice data stored in the storing portion to the phone terminals except the phone terminal to which the voice data is transmitted.

According to this configuration, since the voice data recorded in the phone terminal that does not transmit the voice data is transmitted, such a situation can be eliminated that the phone terminal that transmits the voice data receives the voice data in which the user's voice of this terminal is recorded. Since essentially a necessity of user's listening the voice emitted by a certain user himself or herself is small, the phone terminal can receive effectively the voice data.

Also, in the server of the present invention, the storing portion stores the voice data from the phone terminal to which the floor is not granted by the floor managing portion to correlate with identification information used to identify the phone terminal, and when the floor managing portion grants the floor to none of the phone terminals, the server transmitting portion reads the identification information from the storing portion in storing order and transmits the voice data stored to correlate with the identification information to the phone terminals except the phone terminal that is specified by the identification information.

According to this configuration, even when a certain user records the talking contents plural times or even when plural users records the talking contents respectively, the server can transmit the talking contents to the cellular phones except the cellular phone that the user who recorded the talking contents utilizes, in recording order of the talking contents.

Also, in the server of the present invention, when the floor managing portion grants the floor to none of the phone terminals after a predetermined time is elapsed from a point of time a transmission of the voice data stored in the storing portion is terminated, the server transmitting portion transmits the voice data stored in the storing portion.

According to this configuration, the process of transmitting directly the talking contents from the cellular phone to which the floor is granted to the cellular phone to which the floor is not granted can be handled on a preferential basis after one talking contents is transmitted. Therefore, for example, when the server transmits plural recorded talking contents after some cellular phone ends the talking, such a situation can be prevented that, because the transmission of plural talking contents is continued on and on, it takes much time until the transmission of the urgent talking contents is started.

Also, in the server of the present invention, the storing portion stores the voice data received by the server receiving portion in predetermined pieces.

According to this configuration, since the number of the recordable talking contents is limited, such a situation can be prevented that the transmission of plural talking contents is continued on and on when plural recorded talking contents are to be transmitted.

Advantages of the Invention

According to the phone terminal, the server, the talking system having the phone terminals and the server, and the talking method of the present invention, the user who is attending the PoC talking can talk at a desired timing.

BRIEF DESCRIPTION OF THE DRAWINGS

FIG. 13 Another example of the data format of the control signal.

Figure 1:
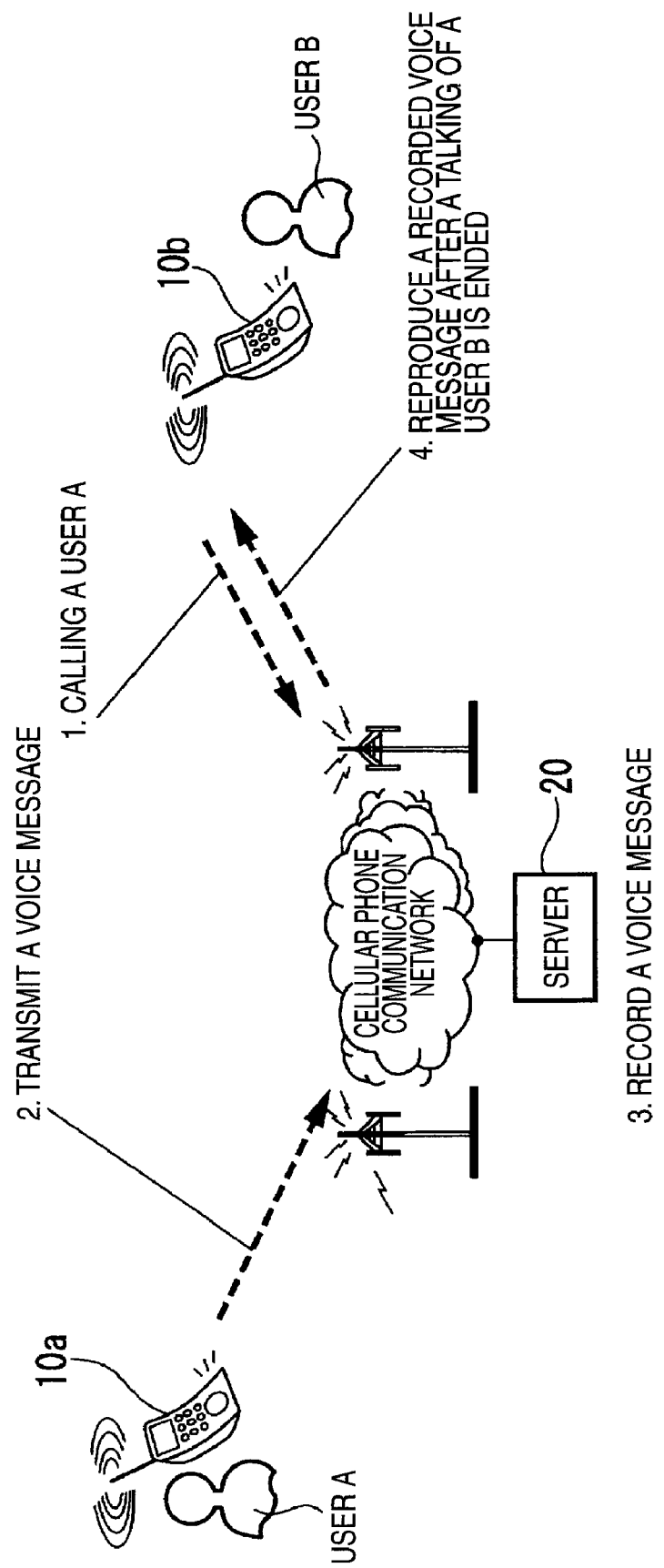
FIG. 1 A conceptual view of a talking system according to embodiments of the present invention.

DESCRIPTION OF REFERENCE NUMERALS AND SIGNS 10a, 10b cellular phone
20 server
31 PTT1 key
32 PTT2 key
33 display
34 status of a user
35 status of a floor
41 radio portion
42 microphone
43 speaker
44 status managing portion
45 screen displaying portion
46 operation key
47 antenna
48, 1201 controlling portion
51 floor management information receiving portion
52 floor management information transmitting portion
53 floor status store buffer
54 floor managing portion
55 voice data receiving portion
56 voice data transmitting portion
57 PoC talking managing portion
58 received message storing portion
59 message store buffer
60 stored message acquiring portion
61 message managing portion

BEST MODE FOR CARRYING OUT THE INVENTION

Figure 2:
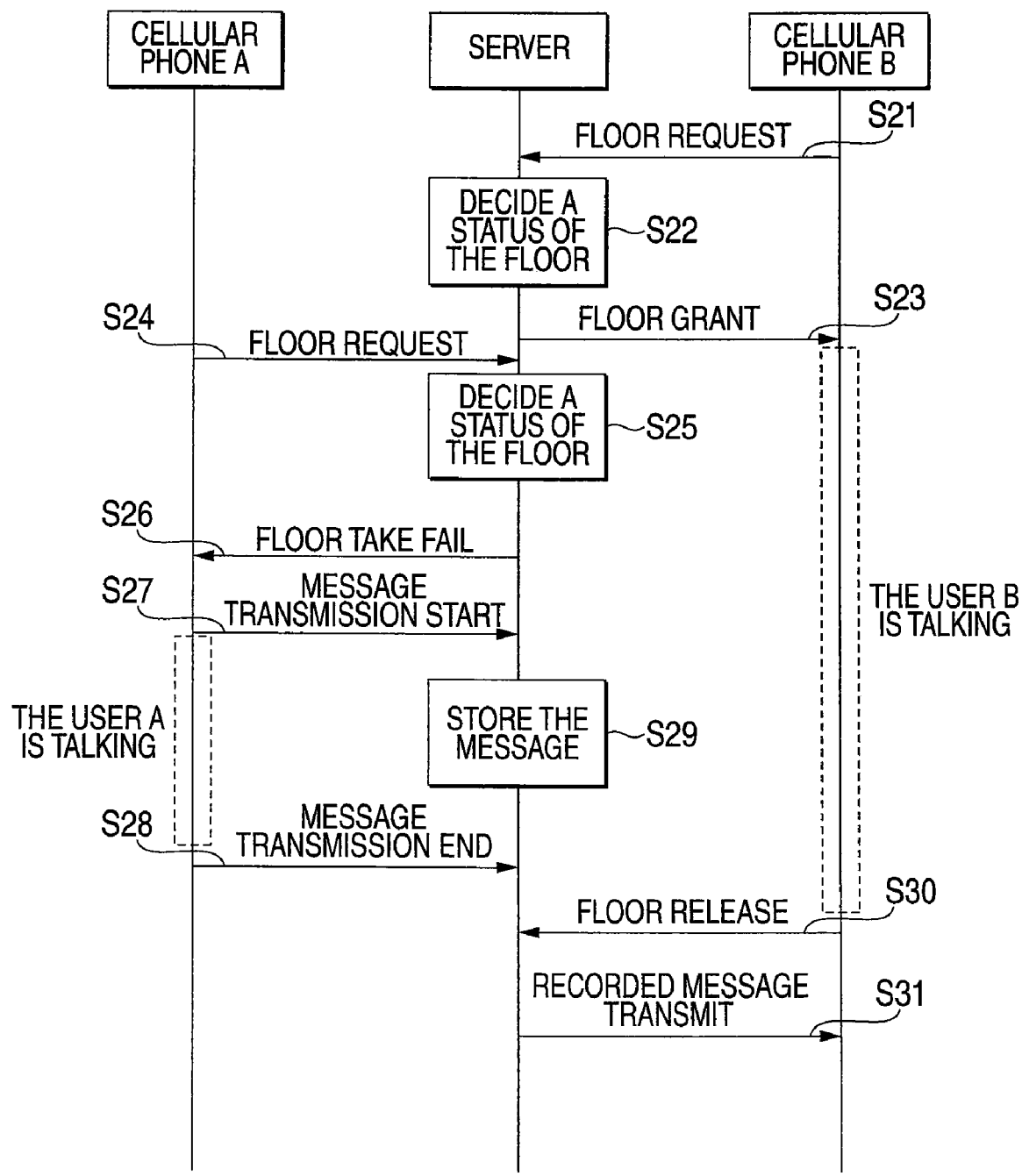
FIG. 2 An outline of a sequence in the talking system according to embodiments of the present invention.

An outline of processes in a talking system according to embodiments of the present invention will be explained with reference to the drawings hereinafter. A conceptual view of a talking system according to embodiments of the present invention is shown in FIG. 1. An outline of a sequence in the talking system according to embodiments of the present invention is shown in FIG. 2. In order to explain an outline of the talking system according to embodiments of the present invention, the talking system shown in FIG. 1 discusses the case where the PoC talking is done between a cellular phone A 10a owned by a user A and a cellular phone B 10b owned by a user B.

An outline of processes of the talking system according to embodiments of the present invention will be explained in a sequence shown in FIG. 2 hereunder.

First, when the user B executes the operation (e.g., selects the user A as a person the user B talks to on the phone from the phone book and pushes the particular button) by the cellular phone B 10b to start the PoC talking with the user A, the cellular phone B 10b requests a server 20 to grant the floor (step S21). Then, when the server 20 is informed by the cellular phone B that the PoC talking is started between the cellular phone A 10a and the cellular phone B 10b, such server decides a current status of the floor (step S22). At this time, since the cellular phones A, B that do the PoC talking are in a status "Floor Idle" in which the floor is not granted, the server transmits a signal to grant the floor to the cellular phone B 10b (step S23), and then the server updates a status of the floor to the "Floor Grant". When the cellular phone B 10b succeeded in getting the floor from the server 20, the user B can start the talking and can continue to talk while such user pushes the particular button (This process corresponds to "1. Calling the user A" in FIG. 1). Here, in FIG. 2, suppose that the user B continues to talk in a period of time encircled by a dotted line after the floor is granted to the cellular phone B 10b.

In contrast, when the cellular phone A 10a that received the start of the PoC talking from the cellular phone B 10b accepts the operation (push the particular button) from the user A to talk with the user B, such cellular phone B requests the server 20 to grant the floor (step S24). At this time, the server 20 also decides a current status of the floor (step S25). When the server 20 is requested by the cellular phone A 10a to grant the floor during a period of time a status of the floor is the "Floor Grant", such server transmits a signal to the cellular phone A 10a to inform that the floor cannot be granted (step S26). As a result, the cellular phone A 10a fails in getting the floor from the server 20. When the cellular phone A 10a is informed of the fact that the floor cannot be granted, such cellular phone A accepts the talking contents that are to be reproduced after the user B released the floor from the user A and transmits the voice of talking contents to the server (suppose that the user A continue to talk in a period of time encircled by a dotted line from step S27 to step S28. This process corresponds to "2. Transmit a voice message" in FIG. 1). In other words, the cellular phone A 10a is switched either to do the PoC talking or to do the talking that is reproduced after the cellular phone B released the floor, depending upon whether or not the floor is granted. Here, the cellular phone B 10b is switched like the cellular phone A 10a, and starts the PoC talking in step S23 as the result that the floor is granted.

The server 20 that received the voice from the cellular phone A 10a records the voice (forms the voice message) (This process in step S29 corresponds to "3. Record a voice message" in FIG. 1).

When the user B executes the operation (releases the particular button) by the cellular phone B 10b to end the PoC talking after the user B ends the talking, this cellular phone B 10b informs the server 20 that the floor is released (step S30). When the server 20 is informed by the cellular phone B 10b that the floor is released, this server updates the "Floor Grant" to a status of floor indicating the "Floor Idle". Also, when a status of the floor is the "Floor Idle" and also the server possesses a recorded voice message, the server 20 transmit the recorded voice message to the cellular phone B 10*b* (step S31). The cellular phone B 10*b* reproduces the voice message received from the server 20 (This process corresponds to "4. Reproduce a recorded voice message after a talking of a user B is ended" in FIG. 1. The process of reproducing the recorded voice message made by the user who did not accept the grant of the floor after the user who accepts the grant of the floor released the floor is called a "post-reproducing process" hereinafter, and also the recorded voice message is called a "post-reproduced message" hereinafter).

According to the talking system of the embodiments of the present invention, the user of the cellular phone can do the talking irrespective of whether the floor is granted to the cellular phone or not, i.e., the user can do the talking with the other cellular phone to which the floor is not granted during a period of time the floor is granted to the user's own cellular phone whereas the user can cause the server to record the talking contents once during a period of time the floor is not granted to the user's own cellular phone and then can reproduce the recorded talking contents toward other cellular phones after the cellular phone to which the floor is granted released this floor. Therefore, the user who is attending the PoC talking can talk at a desired timing. Also, such a situation can be considered during the reproduction of the post-reproduced message that the floor is granted to the cellular phone that caused the server to record the talking contents. Therefore, no contradiction to the floor managing method in the conventional server is caused. Next, configurations and processed contents of the cellular phone and the server constituting the talking system according to embodiments of the present invention will be explained in detail hereunder.

First Embodiment

Figure 3:
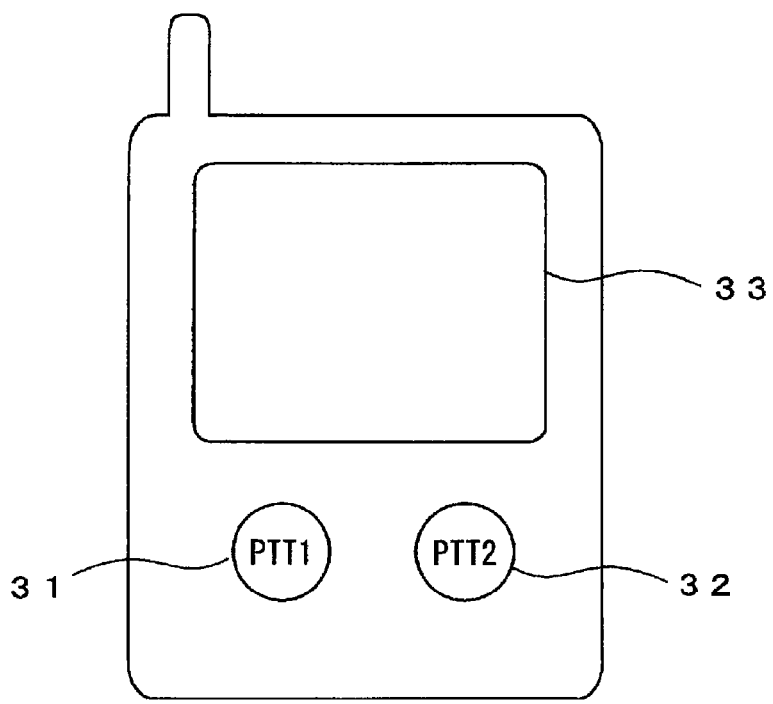
FIG. 3(a) is an exterior view of a cellular phone in the talking system according to a first embodiment of the present invention, and (b) is display examples of a display.
Figure 3:
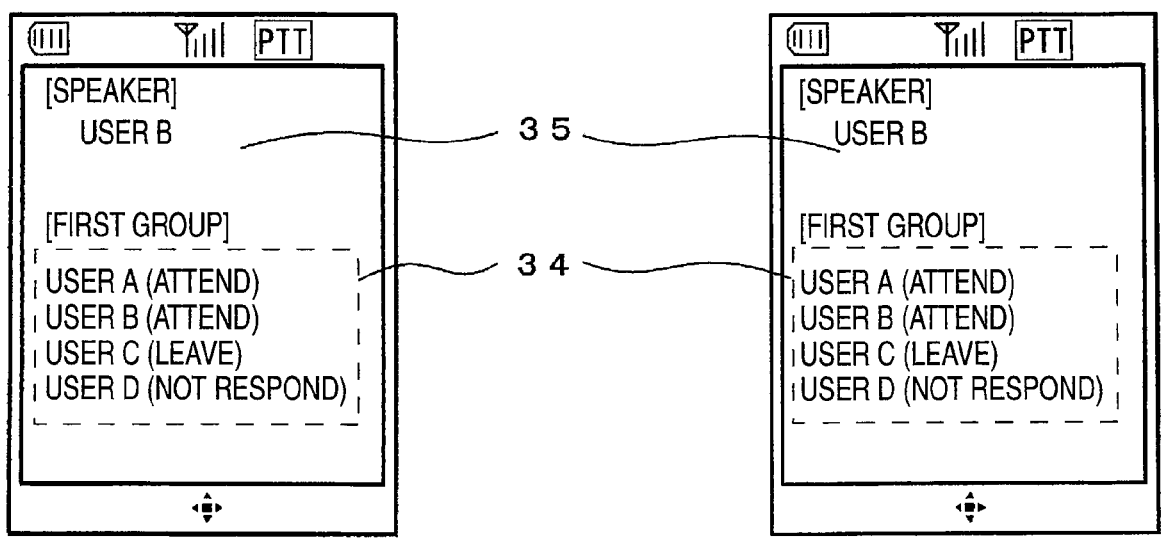
Figure 4:
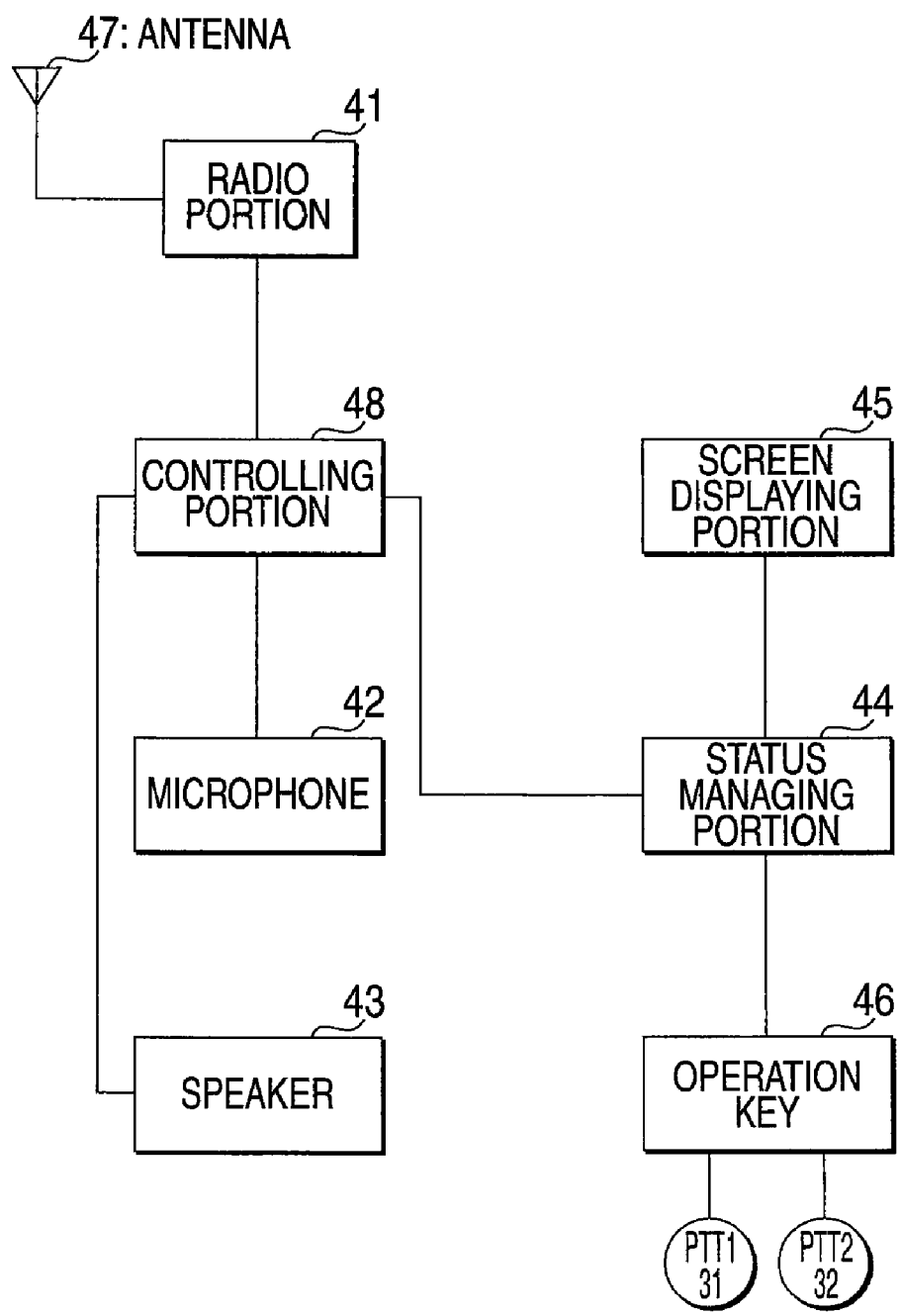
FIG. 4 A configurative view of the cellular phone in the talking system according to the first embodiment of the present invention.
Figure 5:
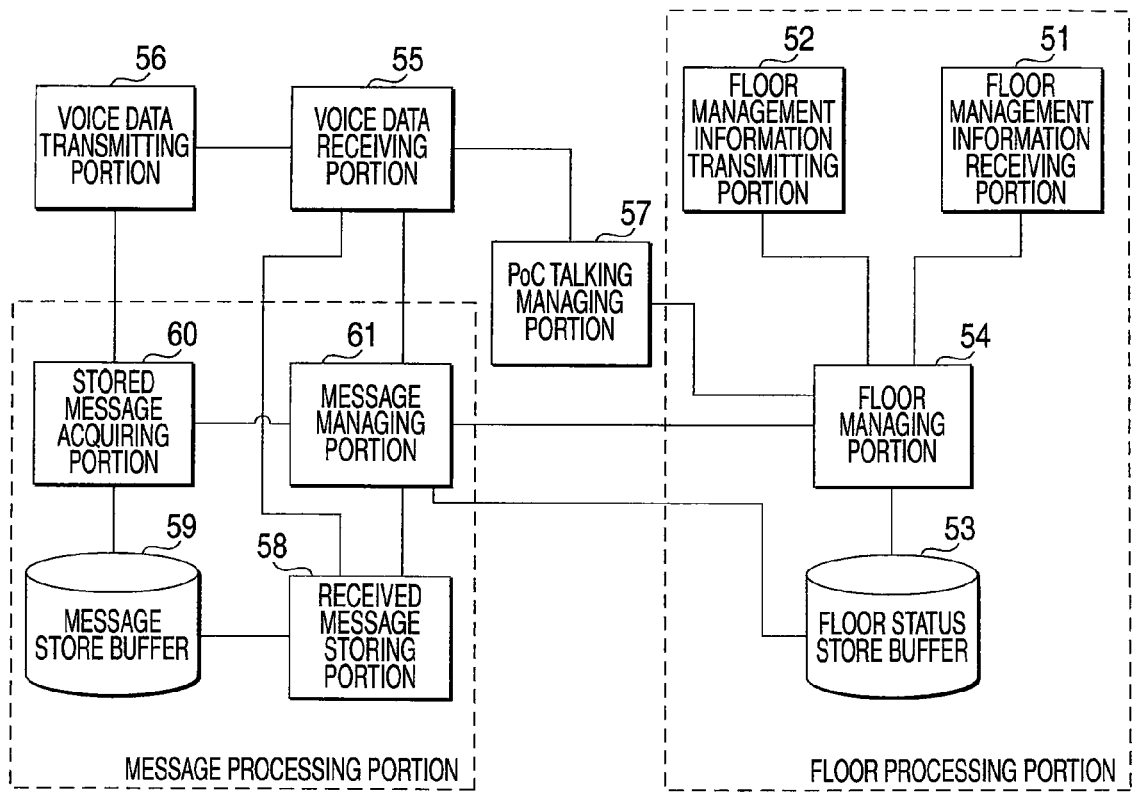
FIG. 5 A configurative view of a server in the talking system according to the first embodiment of the present invention.

An exterior view of a cellular phone in the talking system according to a first embodiment of the present invention is shown in FIG. 3. A configurative view of the cellular phone in the talking system according to the first embodiment of the present invention is shown in FIG. 4. A configurative view of a server in the talking system according to the first embodiment of the present invention is shown in FIG. 5.

As an appearance example of the cellular phone of the present invention, as shown in FIG. 3(*a*), the cellular phone having two types of PTT (PTT: Push-to-Talk) keys 31, 32 and a display 33 can be listed. The PTT key 31 as one operation key corresponds to the particular button that is pushed/released to do the PoC talking, as described in the "Background Art" column. Also, the other PTT key 32 is a button used to record the talking contents in the post-reproducing process, as described in this item. An operational example of the PTT key 32 will be described later.

Also, display examples that are displayed on the display 33 of the cellular phone of the present invention during the PoC talking respectively are shown in FIG. 3(*b*). Two display examples show the case where the PoC talking is done in the first group composed of the users A, B, C. It can be confirmed based on a status 34 of the user that the users A, B attend this PoC talking while the users C, D do not attend the PoC talking. The left side one out of two display examples shows a display example of the display 33 of the cellular phone that the user B in FIG. 1 is using, and the right side one shows a display example of the display 33 of the cellular phone that the user A in FIG. 1 is using. It can be confirmed based on a status 35 of the floor that the user B is now speaking while the user A cannot take the floor at present because the user B is speaking. In doing the PoC talking, the user of the cellular phone looks at the display 33 displayed like FIG. 3(*b*) and then pushes/releases the PTT1 key 31 and the PTT2 key 32 while checking the user's attending condition to the PoC talking and statuses of the floors that are granted to the users.

As shown in FIG. 4, the cellular phone of the present invention includes a radio portion 41 with an antenna 47, a microphone 42, a speaker 43, a status managing portion 44, a screen displaying portion 45, an operation key 46 with a PTT1 key 31 and a PTT2 key 32, and a controlling portion 48.

Figure 6:
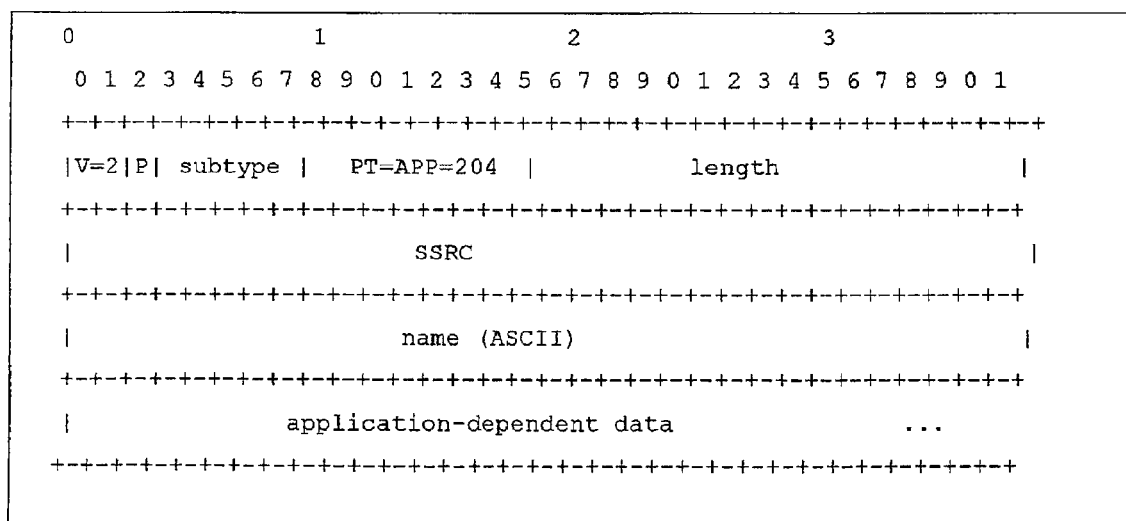
FIG. 6 A data format of a control signal.

The radio portion 41 hold radio communication with the server, and transmits/receives at least the control signal to do the PoC talking or the post-reproducing process and the voice data such as the voice data for the PoC talking, the post-reproduced message, or the like. A data format of the control signal is shown in FIG. 6. This control signal is constructed by V (Version Number of the data format of the control signal), P (Presence or Absence of Padding), Subtype (Control Signal Type), PT (Packet Type), length (Packet Size), SSRC (Packet Sender Information), Name (PoC1 Fixed Value), and Application-dependent data (Field designated by Subtype and having a different application every type). In particular, the type of the control signal is discriminated based on the numerical value allocated to "Subtype" (the numerical values 0, 1, 2, 3, 4, 5 are allocated to floor request notice, floor grant notice, floor take fail notice, floor release notice, floor idle notice, floor granted notice, and the like respectively).

The microphone 42 picks up the user's talking of the cellular phone, converts it into a digital signal, and outputs the signal to the controlling portion 48. The speaker 43 converts voice data input from the controlling portion 48 into an analog signal and outputs the signal. The status managing portion 44 causes the screen displaying portion 45 to display the events that the floor is granted to the user's own cellular phone or not, the current talking is the PoC talking, the current talking is executed to form the post-reproduced message, or the like based on the control signal input from the controlling portion 48, or accepts the inputting operation by the PTT1 key 31 and the PTT2 key 32 to output the instruction indicating to which one of the PoC talking process and the post-reproducing process the voice picked up by the microphone 42 should be subjected, to the controlling portion 48. The controlling portion 48 carries out the processes given as follows.

(A1) When the controlling portion 48 accepts the instruction for the PoC talking from the status managing portion 44 that accepted the pushing of the PTT1 key 31, the controlling portion 48 controls the radio portion 41 to transmit the floor request notice that requests the server to grant the floor.

(A2) When the controlling portion 48 receives the floor grant notice informing that the floor is granted from the radio portion 41, the controlling portion 48 starts the PoC talking process. At this time, the controlling portion 48 switches the talking process/talk receiving process of the PoC talking in response to the pushing/release of the PTT1 key 31 in FIG. 3 made by the user of the cellular phone.

(A3) When the controlling portion 48 receives the floor take fail notice informing that the floor cannot be granted from the radio portion 41 after (A1), the controlling portion 48 controls the status managing portion 44 to cause the screen displaying portion 45 to display the effect that the floor cannot be granted to the user's own cellular phone. Also, the controlling portion 48 is informed from the status managing portion 44 by the pushing of the PTT2 key 32 that the process of starting the recording of the post-reproduced message is accepted, it controls the radio portion 41 to transmit the voice data that is input during a period of time the PTT2 key 32 is being pushed.

In this case, various functions that the up-to-date cellular phone possesses can be provided to the cellular phone of the present invention. In particular, a configuration in which the phone function may be provided in addition to the PoC function may be employed.

As shown in FIG. 5, the server 20 of the present invention is constructed to include a floor management information receiving portion 51, a floor management information transmitting portion 52, a floor status store buffer 53, a floor managing portion 54, a voice data receiving portion 55, a voice data transmitting portion 56, a PoC talking managing portion 57, a received message storing portion 58, a message store buffer 59, a stored message acquiring portion 60, and a message managing portion 61. In FIG. 5, in order to manage the floor granted to the cellular phone or the floor released from the cellular phone, the floor management information receiving portion 51, the floor management information transmitting portion 52, the floor managing portion 54, and the floor status store buffer 53 are given collectively as a floor processing portion. Also, in order to handle the process applied to the post-reproduced message received from the cellular phone or transmitted to the cellular phone, the received message storing portion 58, the message store buffer 59, the stored message acquiring portion 60, and the message managing portion 61 are given collectively as a message processing portion.

The floor management information receiving portion 51 holds radio communication with the cellular phone of the present invention, and receives the control signal to execute the PoC talking or the post-reproducing process. The floor management information transmitting portion 52 holds radio communication with the cellular phone of the present invention, and transmits the control signal to execute the PoC talking or the post-reproducing process. The floor status store buffer 53 stores a status of the floor indicating the "Floor Grant" or the "Floor Idle". The floor managing portion 54 repeats four processes given as follows.

(B1) When the floor managing portion 54 receives the floor request notice for requesting that the floor should be granted from the cellular phone by the floor management information receiving portion 51 during a period of time a status of the floor stored in the floor status store buffer 53 is the "Floor Idle", it controls the floor management information transmitting portion 52 to transmit the floor grant notice informing that the floor can be granted to this cellular phone, and controls the floor status store buffer 53 to update a status of the floor to the "Floor Idle". Also, the floor managing portion 54 informs the PoC talking managing portion 57 that the floor can be granted to this cellular phone.

(B2) When the floor managing portion 54 receives the floor request notice for requesting that the floor should be granted from another cellular phone (the cellular phone to which the floor has been granted and another cellular phone to which the floor has not been granted yet can be discriminated based on SSRC of the control signal) by the floor management information receiving portion 51 during a period of time a status of the floor stored in the floor status store buffer 53 is the "Floor Idle", it controls the floor management information transmitting portion 52 to transmit the floor take fail notice informing that the floor cannot be granted to another cellular phone. Also, the floor managing portion 54 informs the message managing portion 61 of the instruction that the voice data received from another cellular phone should be recorded as the post-reproduced message.

(B3) When the floor managing portion 54 receives the floor release notice informing that the floor is released from the cellular phone to which the floor has been granted by the floor management information receiving portion 51, it informs the message managing portion 61 of the Floor Idle notice informing that there is no cellular phone to which the floor has been granted. If the floor managing portion 54 informed the message managing portion 61 of the instruction for recording the post-reproduced message from another cellular phone in (B2), it informs the message managing portion 61 of the floor grant notice informing that the floor should be granted to another cellular phone.

(B4) When the floor managing portion 54 receives the floor release notice informing that the cellular phone to which the floor has been granted in (B3) releases the floor from the message managing portion 61 after the message managing portion 61 reproduced the post-reproduced message, it updates a status of the floor stored in the floor status store buffer 53 to the "Floor Idle".

Also, the voice data receiving portion 55 receives the voice data of the PoC talking or the voice data of the post-reproduced message from the cellular phone of the present invention. The voice data transmitting portion 56 transmits the voice data of the PoC talking or the voice data of the post-reproduced message received by the voice data receiving portion 55 to another cellular phone. In this case, the voice data transmitting portion 56 transmits directly the voice data received by the voice data receiving portion 55 to another cellular phone during the PoC talking.

When the PoC talking managing portion 57 is informed of the fact that the floor has been granted to a particular cellular phone by the floor managing portion 54, it causes the voice data receiving portion 55 to receive the voice data of the PoC talking from the cellular phone and controls the portion to do the PoC talking.

Also, the received message storing portion 58 causes the message store buffer 59 to store the voice data received by the voice data receiving portion 55 as the post-reproduced message. The message store buffer 59 stores the post-reproduced message. The stored message acquiring portion 60 reads the post-reproduced message from the message store buffer 59 and causes the voice data transmitting portion 56 to transmit such message. The message managing portion 61 repeats three processes given as follows during the PoC talking.

(C1) When the message managing portion 61 receives the instruction to record the voice data, which is received from the cellular phone to which the floor is not granted, as the post-reproduced message from the floor managing portion 54 during the PoC talking, it controls the received message storing portion 58 to store the voice data received by the voice data receiving portion 55 from the cellular phone and identification information used to identify the concerned cellular phone while correlating them with each other.

(C2) When the message managing portion 61 is informed of the floor idle notice informing that there is no cellular phone to which the floor is granted by the floor managing portion 54, it informs the floor managing portion 54 of the floor request notice requesting that the floor should be granted to the cellular phone discriminated by the above identification information. When the message managing portion 61 received the floor grant notice informing that the floor has been granted to the concerned cellular phone from the floor managing portion 54, it controls the stored message acquiring portion 60 to cause the voice data transmitting portion 56 to transmit the post-reproduced message read from the message store buffer 59 to the cellular phones except the concerned cellular phone.

(C3) When the message managing portion 61 is informed of the fact that the post-reproduced message has been transmitted from the stored message acquiring portion 60, it informs the floor managing portion 54 of the floor release notice informing that the cellular phone to which the floor has been granted in (C2) releases the floor.

Figure 7:
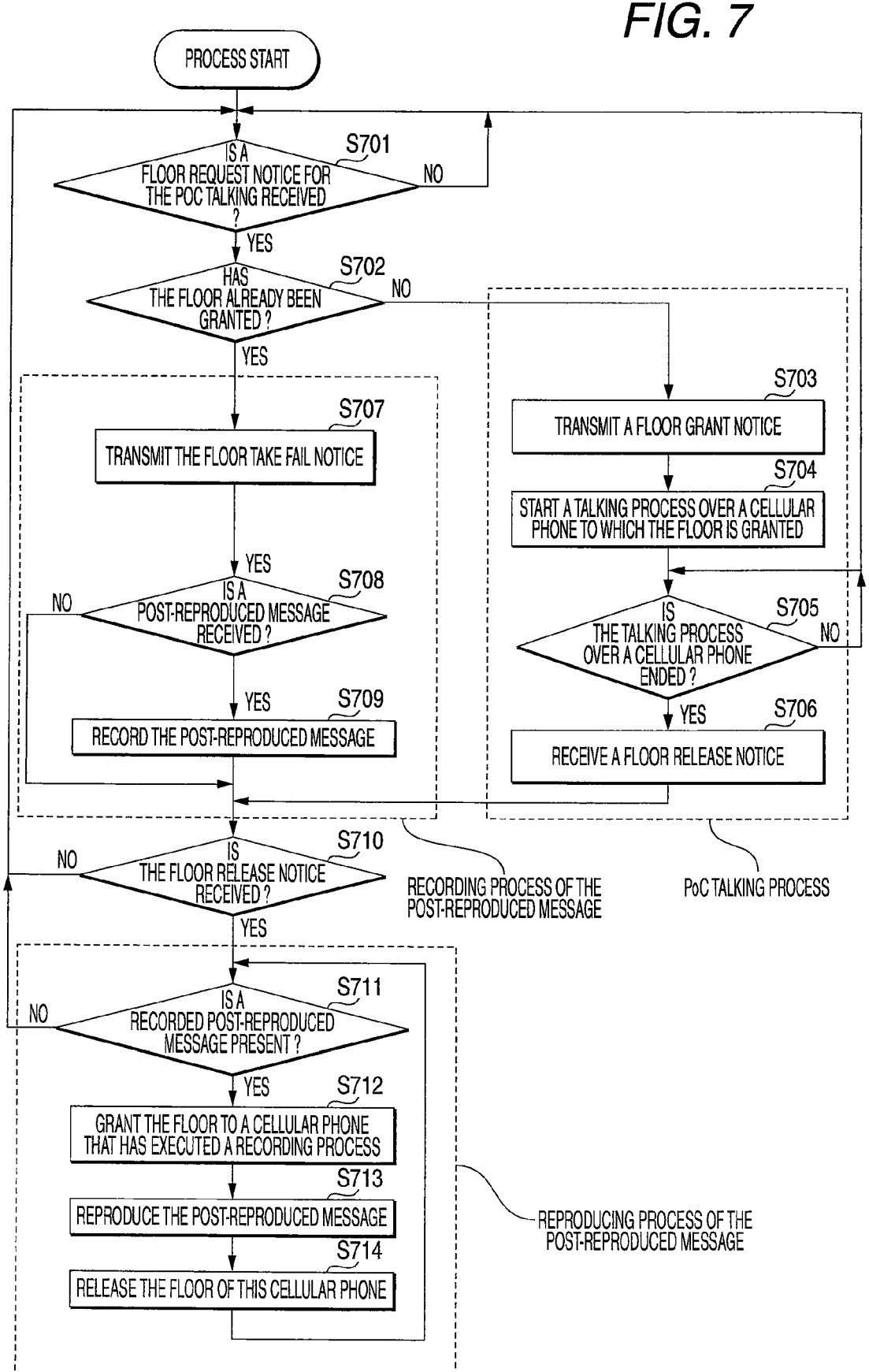
FIG. 7 A flowchart of the server in the talking system according to the first embodiment of the present invention.

Next, a flow of the process of the overall talking system according to the first embodiment of the present invention will be explained with reference to a flowchart of the server in the talking system according to the first embodiment of the present invention shown in FIG. 7 hereunder.

When the cellular phone B 10*b* accepts the instruction to do the PoC talking from the user of the cellular phone, it transmits the floor request notice requesting that the floor should be granted to the server 20 (corresponding to the process in A1). In contrast, when the server 20 receives the floor request notice from the cellular phone B 10*b* (step S701, Yes), it transmits the floor grant notice to grant the floor to the cellular phone B 10*b* (step S703) and updates a status of the floor to the "Floor Grant" since a status of the floor is the "Floor Idle" (step S702, No) (corresponding to the process in B1). After the server 20 transmitted the floor grant notice, it starts the PoC talking process (step S704). Then, the server 20 continues to transmit the talking of the user of the cellular phone B 10*b* to the cellular phone A 10*a* while the user of the cellular phone B 10*b* is pushing the PTT1 key 31 in FIG. 3, and then the server 20 receives the floor release notice from the cellular phone B 10*b* (step S706) when the user of the cellular phone B 10*b* releases the PTT1 key 31 (corresponding to the process in A2). Also, the server 20 receives the floor request notice from the user of the cellular phone A 10*a* (step S701) while it is transmitting the talking of the user of the cellular phone B 10*b* to the cellular phone A 10*a* (step S705, No).

In contrast, when the server 20 receives the floor request notice from the cellular phone A 10*a* in a period of time the server 20 grants the floor to the cellular phone B 10*b* (step S702, Yes), it transmits the floor take fail notice informing that the floor cannot be granted (step S707). Then, when the server 20 receives the post-reproduced message from the cellular phone A 10*a* (step S708, Yes. Corresponding to the processes in A3, B2), it records the post-reproduced message (step S709. Corresponding to the process in C1).

Then, when the server 20 receives the floor release notice from the cellular phone B 10*b* (step S710), it grants the floor to the cellular phone A 10*a* that has executed the recording process (step S712. Here, the floor may granted actually by transmitting the floor grant notice to the cellular phone A 10*a*, or a virtual process of regarding such a situation that the floor has been granted to the cellular phone A 10*a* may be executed only in the server 20 by not actually granting the floor to the cellular phone A 10*a*). Then, the server 20 transmits the post-reproduced message to the cellular phones except the cellular phone that has recorded the post-reproduced message (step S713. Corresponding to the processes in B3, C2).

Then, when the server 20 ends a transmission of the post-reproduced message, such server 20 releases the floor that is granted to the cellular phone A 10*a* (step S714), and then updates a status of the floor to the "Floor Idle" (corresponding to the processes in B4, C3). Here, the case where the user A recorded plural post-reproduced messages may be considered. At this time, after the process in step S 714, it may be decided whether or not the post-reproduced message is still present (step S711). Then, if the post-reproduced message is present (step S711, Yes), the processes in steps S712 to S714 may be repeated. In this case, upon repeating the processes in steps S712 to S714, preferably the process should be executed sequentially from the older one out of the recorded post-reproduced messages.

As described above, according to the talking system of the first embodiment of the present invention, the user of the cellular phone can do the talking irrespective of whether the floor is granted to the cellular phone or not, i.e., the user can do the talking with the other cellular phone to which the floor is not granted during a period of time the floor is granted to the user's own cellular phone, while the user can cause the server to record the talking contents once during a period of time the floor is not granted to the user's own cellular phone and then can reproduce the recorded talking contents toward other cellular phones after the cellular phone to which the floor is granted released this floor. Therefore, the user who is attending the PoC talking can talk at a desired timing.

Also, according to the talking system of the first embodiment of the present invention, as shown in FIG. 2, the cellular phone A 10*a* that requests to get the floor for the talking via the PoC talking transmits the post-reproduced message to the server 20 after it failed to get the floor. In other words, the server 20 specifies the voice data transmitted from the cellular phone that succeeded to get the floor as the voice data for the talking via the PoC talking and specifies the voice data transmitted from the cellular phone that failed to get the floor as the voice data that is recorded as post-reproduced message, by utilizing the floor grant notice and the floor take fail notice used as the control signal for the PoC talking process in the prior art as the discriminating condition. Therefore, the talking system of the first embodiment of the present invention can be accomplished by utilizing the control signal used in the PoC talking in the prior art as it is. As a result, the addition/variation of the function of the cellular phone and the function of the server can be suppressed.

Also, in the talking system of the first embodiment of the present invention, it is described that the post-reproduced message is transmitted to the cellular phones except the cellular phone that recorded the post-reproduced message (step S713. Corresponding to the processes in B3, C2). But the concerned post-reproduced message may be transmitted to the cellular phone that recorded the post-reproduced message. As a result, even when the user who completed the recording of the post-reproduced message is still in a session (during the PoC talking), such user can grasp a timing at which the recorded post-reproduced message is transmitted to other cellular phones.

Second Embodiment

Figure 8:
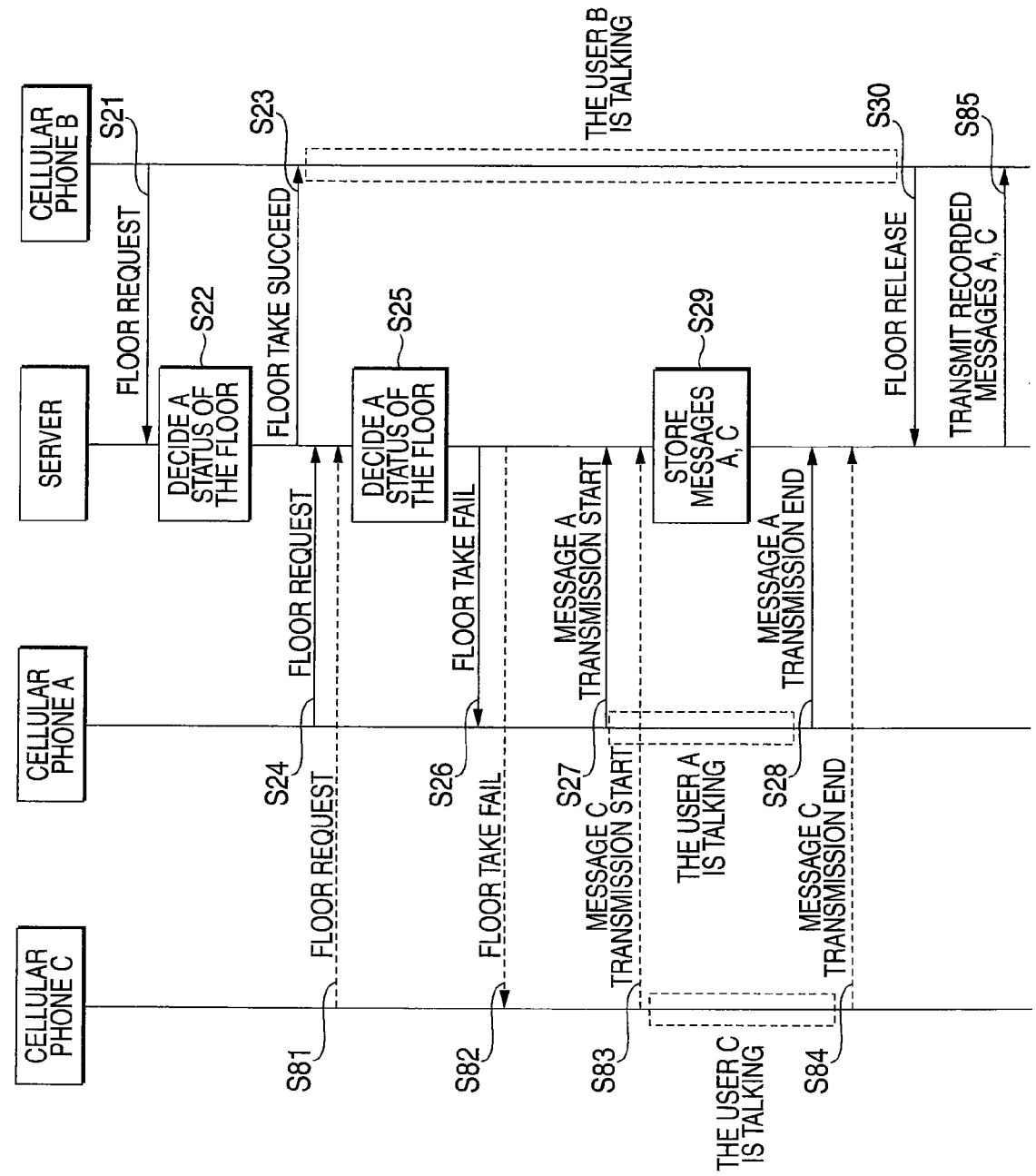
FIG. 8 An outline of a sequence in a talking system according to a second embodiment of the present invention.

In the first embodiment, the case where the number of the users who do the PoC talking is two is explained. In this case, even though the number of users who attend one PoC talking is increased, following steps may be taken, as shown in the outline of the sequence in the talking system according to the second embodiment of the present invention shown in FIG. 8. That is, the post-reproduced message is recorded in the cellular phones (the floor request and the floor take fail are handled in respective cellular phones A, B by the processes in steps S24, S81 and steps S26, S82) to which the floor has not granted respectively (the voice is recorded in a period of time encircled by a dotted line from step S27 to step S28 and a period of time encircled by a dotted line from step S83 to step S84 respectively). Then, the post-reproducing process can be executed by reproducing the recorded post-reproduced messages respectively (step S85) after the cellular phone to which the floor is granted released the floor (step S30). In this case, the PoC talking can be done more smoothly by providing the condition under which the post-reproduced message can be recorded or by doing the talking while granting the floor appropriately to the cellular phone that does the talking via the PoC talking and the cellular phone that reproduces the post-reproduced message. In the second embodiment of the present invention, the talking system capable of executing the PoC talking process and the post-reproducing process more smoothly even when the number of the users who attend the PoC talking is increased is explained hereunder. Here, in the second embodiment, the steps to which the same reference numerals and signs as those in the first embodiment are affixed are common to those explained in the first embodiment.

Next, a flow of the process in the overall talking system according to the second embodiment of the present invention will be explained with reference to a flowchart of the server in the talking system according to the second embodiment of the present invention shown in FIG. 9 hereunder. Here, steps having the same step numbers as those in a flowchart in FIG. 7 execute the processes common to those explained in the first embodiment, and therefore their explanation will be omitted herein.

Figure 9:
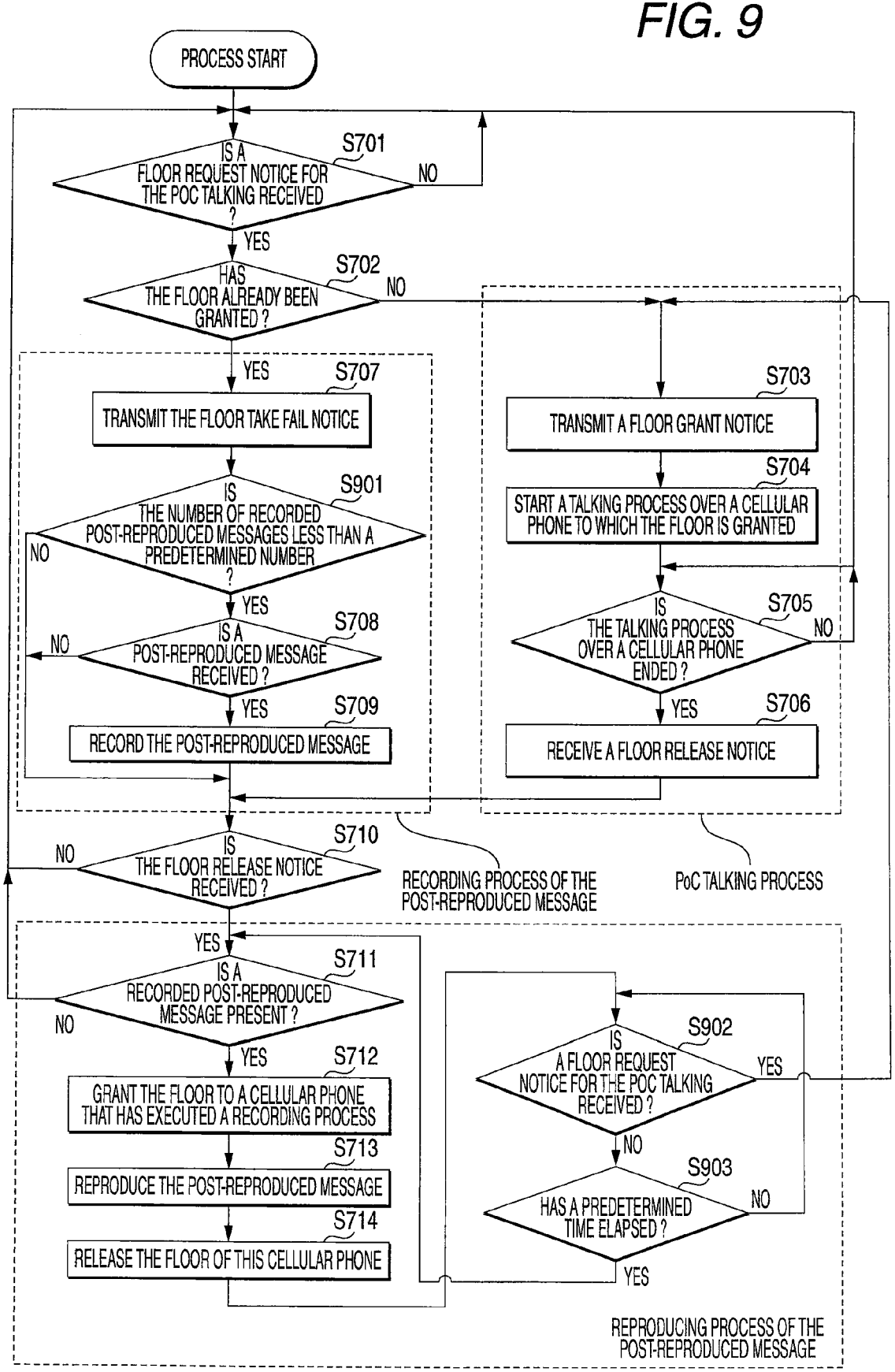
FIG. 9 A flowchart of a server in the talking system according to the second embodiment of the present invention.

In a flowchart of the server in FIG. 9, processes in steps S901 to S903 are newly added. First, the process in step S901 is applied to prevent the event that the post-reproduced messages is recorded in excess of a predetermined number. In the process in step S707, the floor take fail notice informing that the floor cannot be granted is transmitted to the cellular phone A 10a. Then, if the number of the recorded post-reproduced messages is less than a predetermined number (step S901, Yes), the post-reproduced message received from the cellular phone A 10a is recorded (step S709). In contrast, if the number of the recorded post-reproduced messages is more than a predetermined number (step S901, No), the recording process of the post-reproduced message is not executed and then the process goes to step S710. The process in step S901 is executed by the message managing portion 61 in a configurative view of FIG. 5 (Corresponding to the process obtained by adding a function to the process in C1. Called C1').

(C1') When the message managing portion 61 accepts the instruction indicating that the voice data received from the cellular phone to which the floor is not granted should be recorded as the post-reproduced message from the floor managing portion 54 during the PoC talking, it causes the stored message acquiring portion 60 to read the number of the post-reproduced messages that the message store buffer 59 stores. Then, the message managing portion 61 controls the received message storing portion 58 to store the voice data that the voice data receiving portion 55 receives from the concerned cellular phone and the identification information used to identify the concerned cellular phone, in response to the number.

Because the process C1' of the message managing portion 61 is utilized, not only the number of the post-reproduced messages that can be recorded in the server can be set simply but also the number of the post-reproduced messages that can be recorded every cellular phone specified by the above identification information can be set. Therefore, for example, when the post-reproduced message is reproduced after the talking done by a certain cellular phone (plural cellular phones may be employed) via the PoC talking is ended, such a situation can be prevented that the new talking via the PoC talking is disturbed because the reproduction of plural post-reproduced messages is continued for a long time. In this case, the number of recordable post-reproduced messages may be varied in response to the number of users who are attending to one PoC talking or the talking continue time by a certain cellular phone.

Also, in the processes in steps S902, S903, the reproduction of another post-reproduced message is not executed successively after one post-reproduced message is reproduced, for the floor request to do the talking via the PoC talking should be accepted on a preferential basis until a predetermined time has elapsed. In other words, in the process in step S901, such a situation can be prevented by limiting the recordable number of the post-reproduced message that the reproduction of a plurality of post-reproduced messages is continued. In contrast, in the processes in steps S902, S903, such a situation can be prevented by providing a period of time during which the talking via the PoC talking is handled preferentially after one post-reproduced message is reproduced that the reproduction of a plurality of post-reproduced messages is continued.

In the process in step S714, when the server 20 releases the floor granted to the cellular phone A 10a after it ends the transmission of the post-reproduced message, such server decides whether or not the floor request notice to do the talking via the PoC talking is received from the cellular phone of the use who is attending the PoC talking (step S902). Then, if the floor request notice is present (step S902, Yes), the server goes to the process in step S703. In contrast, if the floor request notice is not present (step S902, No), the server decides whether or not a predetermined time has elapsed after the process in step S714 (step S903). Then, if it is decided that a predetermined time has elapsed (step S903, Yes), the server goes to the process in step S711. In contrast, if it is decided that a predetermined time has not elapsed (step S903, No), the server goes to the process in step S902. The processes in step S902, S903 are carried out by the floor managing portion 54 (the process after B4. Called B5, B6. B5 is similar to the process in B1 and B6 is similar to the process in B3) and the message managing portion 61 (Corresponding to the process obtained by adding a function to the process in C2. Called C2') in a configurative view in FIG. 5.

(B5) When the floor managing portion 54 receives the floor request notice requesting that the floor should be granted from the cellular phone by the floor management information receiving portion 51 in a period of time a predetermined time has not elapsed after it accepts the floor release notice from the message managing portion 61 in (B4), it controls the floor management information transmitting portion 52 to transmit the floor grant notice informing that the floor was granted to that cellular phone, and also controls the floor status store buffer 53 to update a status of the floor to the "Floor Grant". Also. the floor managing portion 54 informs the PoC talking managing portion 57 that the floor was granted to the concerned cellular phone. Subsequently, the floor managing portion 54 performs the managements described in (B2) to (B4).

(B6) When a predetermined time has elapsed while the floor managing portion 54 does not receive the floor request notice after it accepts the floor release notice from the message managing portion 61 in (B4), the floor managing portion 54 informs the message managing portion 61 of the floor grant notice informing that there is no cellular phone to which the floor is granted. When the floor managing portion 54 informed the message managing portion 61 of the instruction to record the post-reproduced message on a certain cellular phone in (B2), it informs the message managing portion 61 of the floor grant notice informing that the floor is granted to this cellular phone. Subsequently, the floor managing portion 54 performs the management described in (B4).

(C2') When the message managing portion 61 is informed of the floor idle notice informing that there is no cellular phone to which the floor is granted by the floor managing portion 54, it informs the floor managing portion 54 of the floor request notice requesting that the floor should be granted to the cellular phone that is identified by the identification information corresponding to the post-reproduced message that has not been reproduced yet (preferably the older one of the recorded post-reproduced messages should be selected sequentially) out of the identification information stored in the message store buffer 59. When the message managing portion 61 accepts the floor grant notice informing that the floor was granted to the concerned cellular phone from the floor managing portion 54, it controls the stored message acquiring portion 60 to cause the voice data transmitting portion 56 to transmit the post-reproduced message read from the message store buffer 59 to the cellular phones except the concerned cellular phone. Subsequently, the message managing portion 61 performs the management described in (C3).

Because the processes in B5, B6 in the floor managing portion 54 are utilized, a period of time in which the talking via the PoC talking is handled preferentially after one post-reproduced message is reproduced can be provided. Therefore, for example, when the post-reproduced message is reproduced after the talking via the PoC talking done by some cellular phone is ended, such a situation can be prevented that, because the reproduction of plural post-reproduced messages is continued on and on, the new talking via the PoC talking is disturbed. In this case, the above predetermined time may be varied in response to the number of users who are attending to one PoC talking or the talking continue time by a certain user of the cellular phone.

Third Embodiment

In the talking system according to the first and second embodiments of the present invention, the server 20 specifies the voice data transmitted from the cellular phone that succeeded in getting the floor as the voice data used to do the PoC talking and also specifies the voice data transmitted from the cellular phone that fails in getting the floor as the voice data used to record the post-reproduced message, while utilizing the floor grant notice and the floor take fail notice used as the control signal in the PoC talking process in the prior art as the discriminating condition. In a talking system according to a third embodiment of the present invention, such an embodiment will be explained hereunder that the server specifies the voice data transmitted from the cellular phone as the voice data used to do the PoC talking or as the voice data used to record the post-reproduced message, while utilizing a newly set control signal as the discriminating condition.

Figure 10:
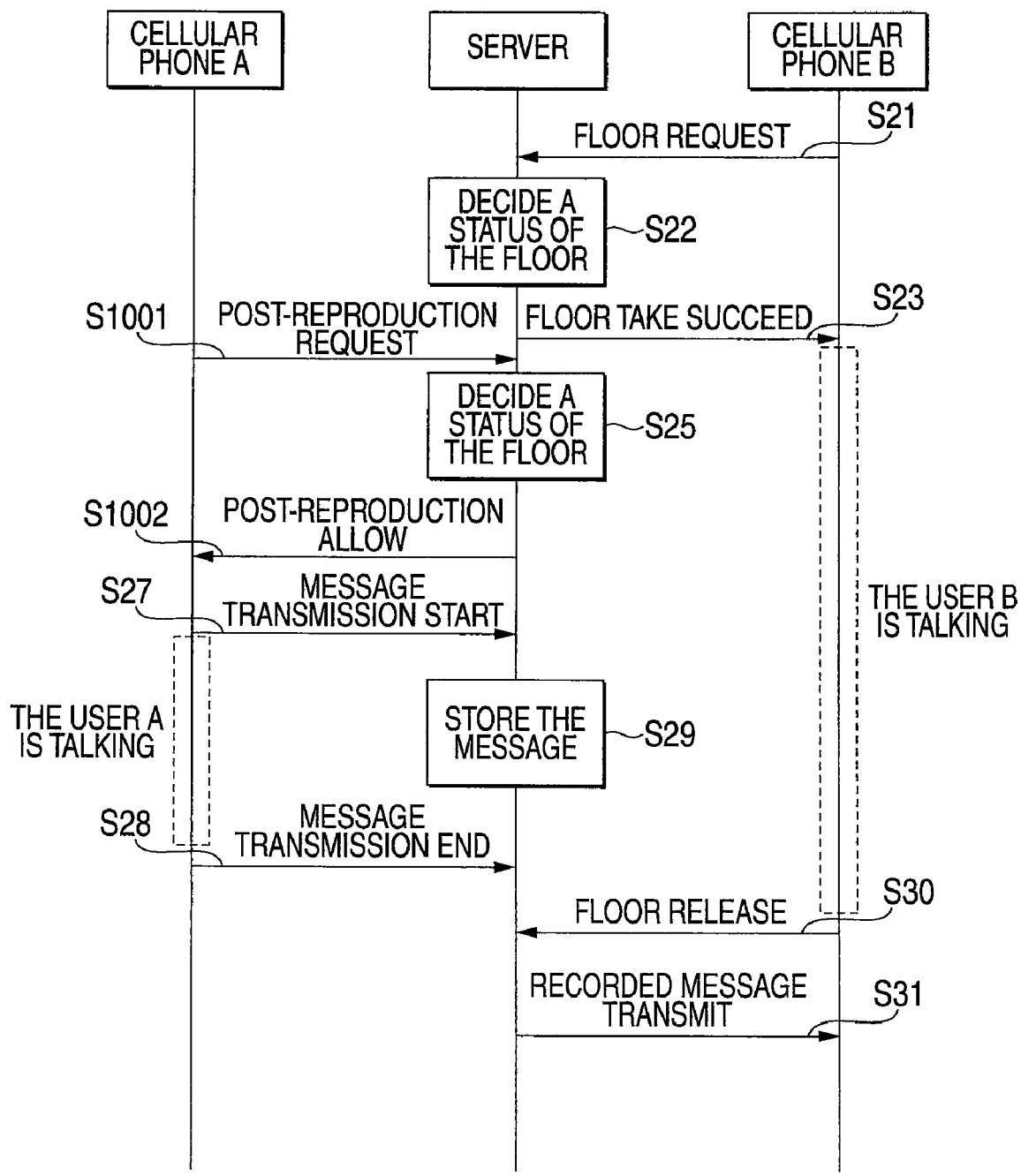
FIG. 10 An example of an outline of a sequence in a talking system according to a third embodiment of the present invention.

An example of an outline of a sequence in a talking system according to a third embodiment of the present invention is shown in FIG. 10. In the sequence in FIG. 10, processes in steps S24 and S26 of the outline of the sequence in the talking system according to the embodiments of the present invention shown in FIG. 2 are different (steps S1001 and S1002 in FIG. 10 correspond to changed processes. Since respective processes except steps S24 and S26 are common, their explanation will be omitted herein).

When the cellular phone A 10a that accepted the start of the PoC talking from the cellular phone B 10b receives the operation to do the talking with the user B (pushing of the particular button) from the user A, it requests the server 20 to transmit the post-reproduced message (step S1001). At this time, the server 20 decides a current status of the floor (step S25). When the server 20 is requested by the cellular phone A 10a to transmit the post-reproduced message in a period of time a status of the floor is the "Floor Grant", it transmits a signal that allows the transmission of the post-reproduced message to the cellular phone A 10a (step S1002). When the cellular phone A 10a is allowed to transmit the post-reproduced message, it accepts the talking contents being reproduced after the user B releases the floor from the user A, and then transmits the voice of the talking contents to the server (suppose that the user A continues to talk in a period of time encircled by a dotted line from step S27 to step S28). That is, the cellular phone A 10a selects that it does the reproducing talking after the cellular phone B releases the floor, irrespective of whether the floor is actually granted or not.

Figure 11:
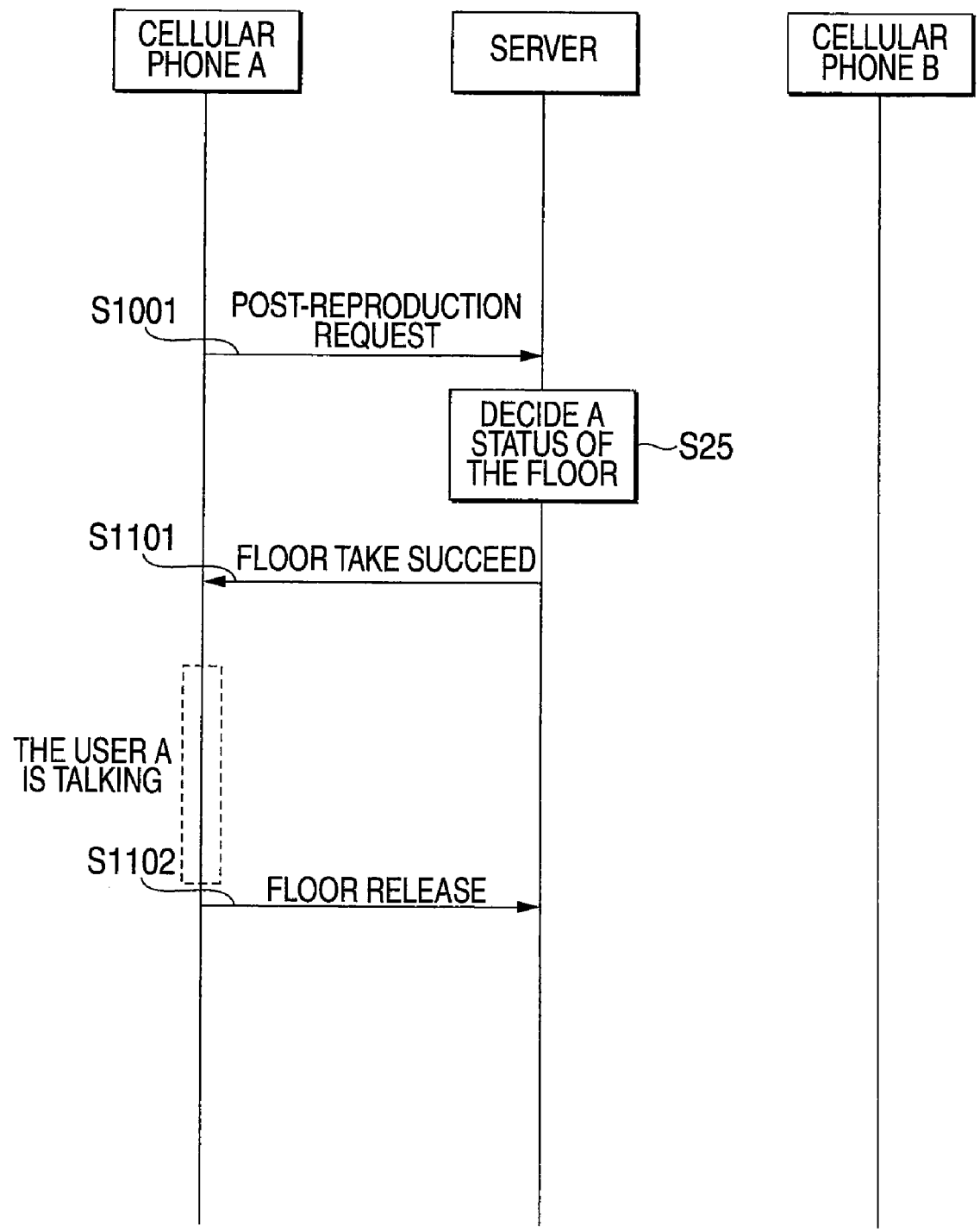
FIG. 11 Another example of an outline of the sequence in the talking system according to the third embodiment of the present invention.

Also, another example of the outline of the sequence in the talking system according to the third embodiment of the present invention is shown in FIG. 11. The sequence shown in FIG. 11 is different from the outline of the sequence in the talking system according to the third embodiment of the present invention shown in FIG. 10 in that the cellular phone B 10b does not take the floor. As shown in sequence in FIG. 11, such a case is supposed that, when the cellular phone A 10a selects to do the talking that is reproduced after other cellular phones released the floor regardless of whether or not the floor is actually granted to this cellular phone, such cellular phone requests the server to transmit the post-reproduced message in a situation that no floor is granted to all cellular phones. The outline of the sequence in the talking system in the talking system in such case will be explained hereunder.

The cellular phone A 10a requests the server 20 to transmit the post-reproduced message (step S1001). The server 20 decides a current status of the floor (step S25). When the server 20 is requested by the cellular phone A 10a to transmit the post-reproduced message in a period of time a status of the floor is the "Floor Idle", it transmits a signal indicating that the floor can be granted to cellular phone B 10b (step S1101), and then updates a status of the floor to the "Floor Grant". When the cellular phone A 10a succeeded to get the floor from the server 20, the user A starts the talking and can continue to talk while such user is pushing the particular button (in FIG. 11, suppose that the user A continues to talk in a period of time encircled by a dotted line after the floor is granted to the cellular phone A 10a).

When the user A executes the operation to end the talking via the PoC talking (releases the particular button) by the cellular phone A 10a after the talking of the user A is ended, the cellular phone A 10a informs the server 20 to release the floor (step S1102). When the server 20 is informed of the releasement of the floor by the cellular phone A 10a, it updates the "Floor Grant" to a status of the floor indicating the "Floor Idle".

According to the sequence in FIG. 11, even when a certain cellular phone requests the server to transmit the post-reproduced message in a situation that no floor is granted to all cellular phones, this cellular phone can do the PoC talking because the floor can be granted to this cellular phone. Then, configurations and processed contents of the cellular phone and the server constituting the talking system according to this embodiment of the present invention will be explained in more detail hereunder.

Figure 12:
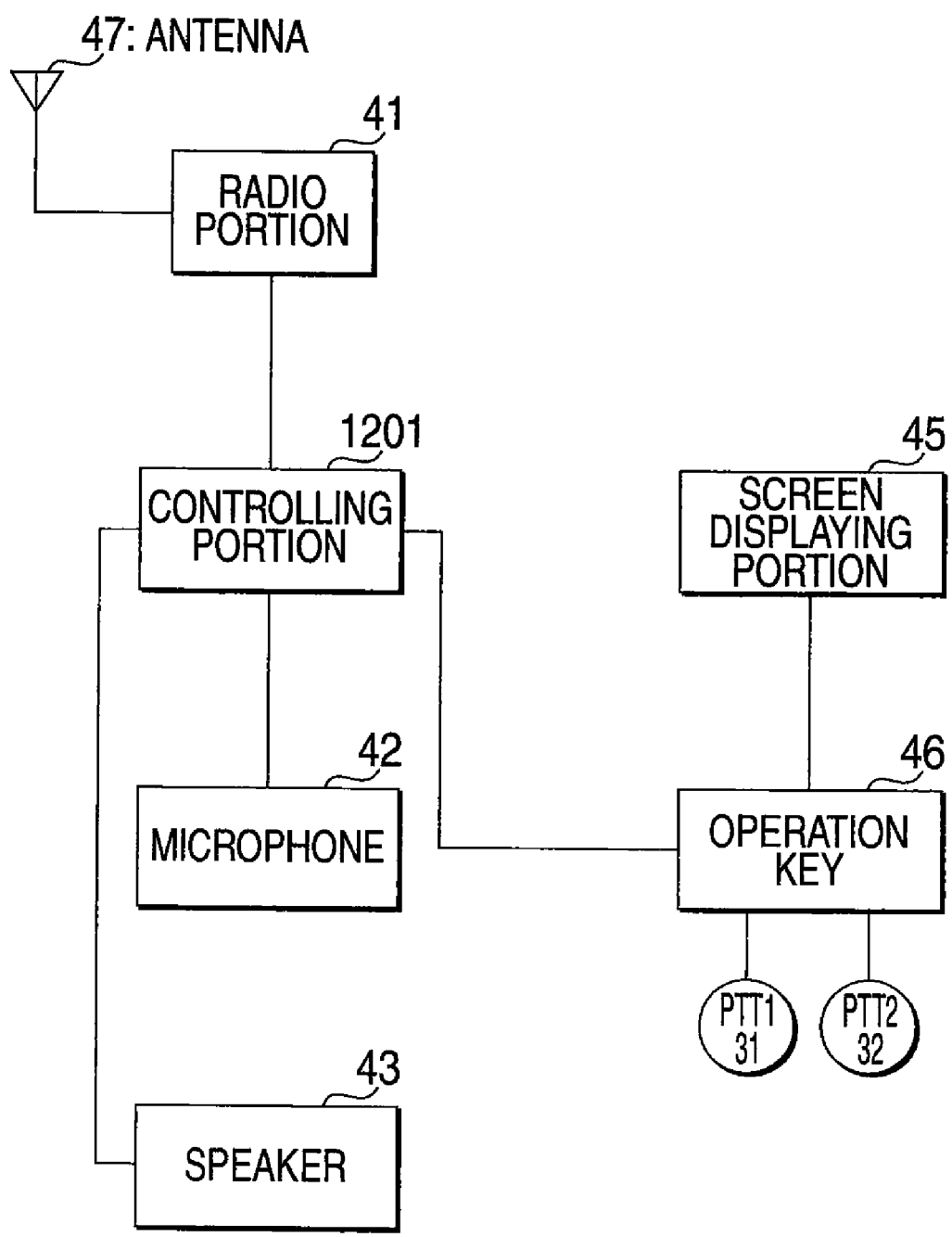
FIG. 12 A configurative view of a cellular phone in the talking system according to the third embodiment of the present invention.

A configurative view of a cellular phone in the talking system according to the third embodiment of the present invention is shown in FIG. 12. In this case, since an external appearance of the cellular phone in the talking system according to the third embodiment of the present invention is common to the first embodiment, its explanation will be omitted herein. Also, since the concerned portions of the cellular phone and the server in the talking system according to the third embodiment of the present invention, to which the same reference numerals and signs as those of the first embodiment are allocated, execute the same processes as those in the first embodiment, their explanation will be omitted herein.

As shown in FIG. 12, the cellular phone of the present invention includes a radio portion 41 with an antenna 47, a microphone 42, a speaker 43, a screen displaying portion 45, an operation key 46 with a PTT1 key 31 and a PTT2 key 32, and a controlling portion 1201. In the configuration of the cellular phone of the present invention, the status managing portion 44 in the cellular phone according to the first embodiment is omitted. The reason for this is that, because the PoC talking request or the post-reproduction request can be accepted by the operation key 46, there is no need for the cellular phone to decide to which one of the talking for the PoC talking and the talking to record the post-reproduced message the current talking corresponds.

The controlling portion 1201 causes the screen displaying portion 45 to display whether or not the floor is granted to the user's own cellular phone, that the current talking is the PoC talking, that the current talking is used to form the post-reproduced message, or the like, causes the radio portion 41 to transmit the control signal based upon the inputting operation by the PTT1 key 31 and the PTT1 key 32, and controls by which one of the PoC talking process and the post-reproducing process the voice picked up by the microphone 42 should be handled, based on the control signal received by the radio portion 41.

As an example of the data format of the control signal, the data format that is common to that shown in FIG. 6 but is different in the data contents of Subtype (Control Signal Type) may be listed. In this Subtype, the numerical value is allocated newly to a "post-reproduce request notice" and a "post-reproduce allow notice" in addition to the types of the control signal (floor request notice, floor grant notice, floor take fail notice, floor release notice, floor granted notice, floor idle notice, and the like) described in the first embodiment (For example, numerical values of 7, 8 are allocated to the "post-reproduce request notice" and the "post-reproduce allow notice" respectively). In this control signal, the types of the control signal containing the "post-reproduce request notice" and the "post-reproduce allow notice" can be discriminated by the numerical values allocated to this Subtype.

Also, as another example of the data format of the control signal, a data format shown in FIG. 13 may be listed. In this control signal, the types of the control signal containing the "post-reproduce request notice" and the "post-reproduce allow notice" can be discriminated by describing additionally a predetermined code in "Application-dependent data" (the field whose application is different every type designated by Subtype). In the "post-reproduce request notice", the post-reproduce request notice can be recognized by describing a post-reproduce request code in "Application-dependent data" of the floor request notice (the control signal to which Subtype "0" is allocated) shown in FIG. 13(a). Similarly, in the "post-reproduce allow notice", the post-reproduce allow notice can be recognized by describing a post-reproduce allow code in "Application-dependent data" of the floor take fail notice (the control signal to which Subtype "2" is allocated) shown in FIG. 13(b). According to this data format, the types of the control signal containing the "post-reproduce request notice" and the "post-reproduce allow notice" can be discriminated.

The controlling portion 1201 executes five processes given as follows.

(A1) When the controlling portion 1201 accepts the instruction to do the PoC talking in response to the pushing of the PTT1 key 31, it controls the radio portion 41 to transmit the floor request notice that requests the server 20 to grant the floor (the process that is common to the process in A1 in the cellular phone in the first embodiment).

(A2) When the controlling portion 1201 receives the floor grant notice to inform that the floor was granted from the radio portion 41, it starts the PoC talking. At this time, the controlling portion 1201 switches the talking process/talk receiving process in the PoC talking in response to the pushing/release of the PTT1 key 31 in FIG. 3 executed by the user of the cellular phone (the process that is common to the process in A1 in the talking system in the first embodiment).

(A3) When the controlling portion 1201 accepts the instruction to record the post-reproduced message in response to the pushing of the PTT2 key 32, it controls the radio portion 41 to transmit the post-reproduce request notice that requests the server 20 to transmit the post-reproduced message.

(A4) When the controlling portion 1201 receives the post-reproduce allow notice used to allow the transmission of the post-reproduced message from the radio portion 41 after (A3), it controls the screen displaying portion 45 to display the event that the recording of the post-reproduced message is allowed to the user's own cellular phone. Also, when the controlling portion 1201 accepts the process to start the recording of the post-reproduced message in response to the pushing of the PTT2 key 32, it controls the radio portion 41 to transmit the voice data being input while the PTT2 key 32 is pushed.

(A5) When the controlling portion 1201 receives the floor grant notice to inform that the floor is granted from the radio portion 41 after (A3), it controls the screen displaying portion 45 to display the event that the floor is granted to the user's own cellular phone. Also, the controlling portion 1201 switches the talking process/talk receiving process in the PoC talking in response to the pushing/release of the PTT2 key 32.

Here, various functions that the up-to-date cellular phone possesses may be provided to the cellular phone of the present invention. In particular, the configuration in which the phone function as well as the PoC function is added may be employed.

The configuration of the server 20 of the present invention is common to that in FIG. 5. The floor managing portion 54 repeats five processes given as follows. Here, the processes that the message managing portion 61 performs during the PoC talking are common to those in C1 to C3 described in the first embodiment.

(B1) When the floor managing portion 54 receives the floor request notice requesting that the floor should be granted from the cellular phone by the floor management information receiving portion 51 during a period of time a status of the floor stored in the floor status store buffer 53 is the "Floor Idle", it controls the floor management information transmitting portion 52 to transmit the floor grant notice informing that the floor is granted to the cellular phone, and controls the floor status store buffer 53 to update a status of the floor to the "Floor Grant". Also, the floor managing portion 54 informs the PoC talking managing portion 57 that the floor is granted to the concerned cellular phone (the process that is common to that in B1 in the server in the first embodiment).

(B2) When the floor managing portion 54 receives the post-reproduce request notice requesting to transmit the post-reproduced message from another cellular phone by the floor management information receiving portion 51 in a period of time a status of the floor stored in the floor status store buffer 53 is the "Floor Grant", it controls the floor management information transmitting portion 52 to transmit the post-reproduce allow notice that allows the transmission of the post-reproduced message to another cellular phone. Also, the floor managing portion 54 informs the message managing portion 61 of the instruction to record the voice data received from another cellular phone as the post-reproduced message.

(B3) When the floor managing portion 54 receives the floor release notice informing that the cellular phone to which the floor is granted releases the floor by the floor management information receiving portion 51, it informs the message managing portion 61 of the floor idle notice informing that there is no cellular phone to which the floor is granted. When the floor managing portion 54 informed the message managing portion 61 of the instruction to record the post-reproduced message from another cellular phone in (B2), it informs the message managing portion 61 of the floor grant notice informing that the floor should be granted to another cellular phone (the process that is common to that in B3 in the server in the first embodiment).

(B4) When the floor managing portion 54 accepts the floor release notice informing that the cellular phone to which the floor is granted in B3 releases the floor from the message managing portion 61 after the message managing portion 61 reproduced the post-reproduced message, it updates a status of the floor stored in the floor status store buffer 53 to the "Floor Idle" (the process that is common to that in B4 in the server in the first embodiment).

(B7) When the floor managing portion 54 receives the post-reproduce request notice requesting that the post-reproduced message should be transmitted from the cellular phone by the floor management information receiving portion 51 in a period of time a status of the floor stored in the floor status store buffer 53 is the "Floor Idle", it controls the floor management information transmitting portion 52 to transmit the floor grant notice informing that the floor is granted to the cellular phone, and controls the floor status store buffer 53 to update a status of the floor to the "Floor Idle". Also, the floor managing portion 54 informs the PoC talking managing portion 57 that the floor is granted to the concerned cellular phone.

Figure 14:
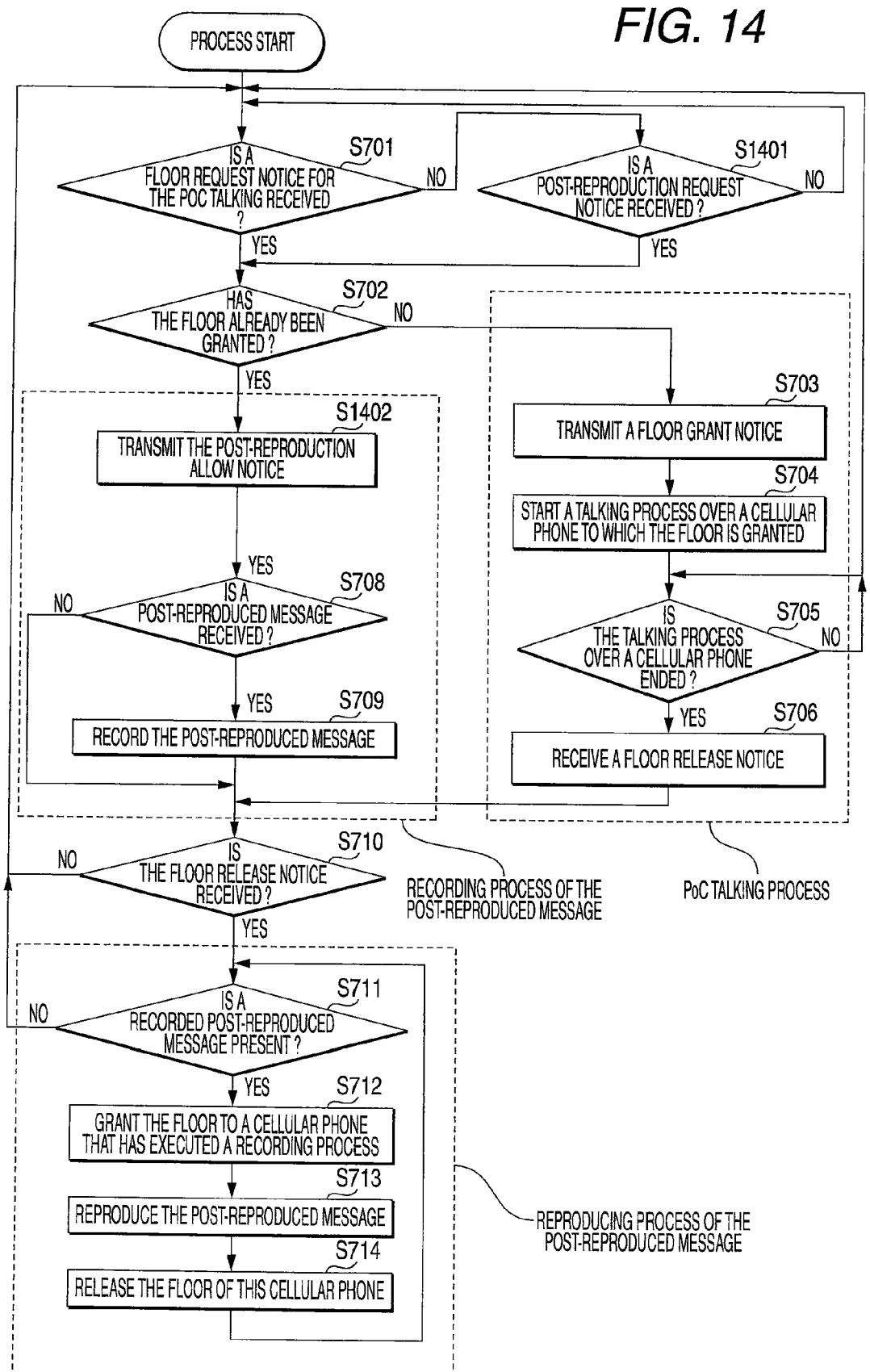
FIG. 14 A flowchart of the server in the talking system according to the third embodiment of the present invention.

Next, a flow of the process of the overall talking system according to the third embodiment of the present invention will be explained with reference to a flowchart of the server in the talking system according to the third embodiment of the present invention shown in FIG. 14 hereunder. In the process of the flowchart in FIG. 14, respective steps to which the same step numbers as those in the flowchart in FIG. 7 are allocated execute the same processes as those in the first embodiment, and therefore their explanation will be omitted here.

When the cellular phone B 10b accepts the instruction to do the PoC talking or the instruction to perform the post-reproducing process from the user of the cellular phone, it transmits the floor request notice requesting the grant of the floor or the post-reproduce request notice requesting the transmission of the post-reproduced message to the server 20 (corresponding to the process in A1 or A3). In contrast, when the server 20 receives the floor request notice from the cellular phone B10b (step S701, Yes) or receives the post-reproduce request notice from the cellular phone B10b (step S701, No, step S401, Yes), such server 20 transmits the floor grant notice to grant the floor to the cellular phone B10b (step S703), and then updates a status of the floor to the "Floor Grant" (corresponding to the process in B1 or B7) because a status of the floor is the "Floor Idle" (step S702, No). When the server 20 transmits the floor grant notice, it starts the PoC talking process (step S704). Then, the server 20 continues to transmit the user's talking of the cellular phone B 10b to the cellular phone A 10a while the user of the cellular phone B 10b is pushing the PTT1 key 31 or the PTT2 key 32, and then receives the floor release notice from the cellular phone B 10b (step S706) when the user of the cellular phone B 10b releases the PTT1 key 31. Also, the server 20 receives the floor request notice from the user of the cellular phone A (step S701) while such server transmits the talking of the user of the cellular phone B 10b to the cellular phone A 10a (step S705, No).

In contrast, when the server 20 receives the floor request notice or the post-reproduce request notice from the cellular phone A 10a while such server is granting the floor to the cellular phone B 10b (step S702, Yes), it transmits the post-reproduction allow notice to allow the transmission of the post-reproduced message (step S1402). Then, when the server 20 receives the post-reproduced message from the cellular phone A 10a (step S708, Yes. Corresponding to the processes in A4, B2), such server records the post-reproduced message (step S709. Corresponding to the process).

Figure 15:
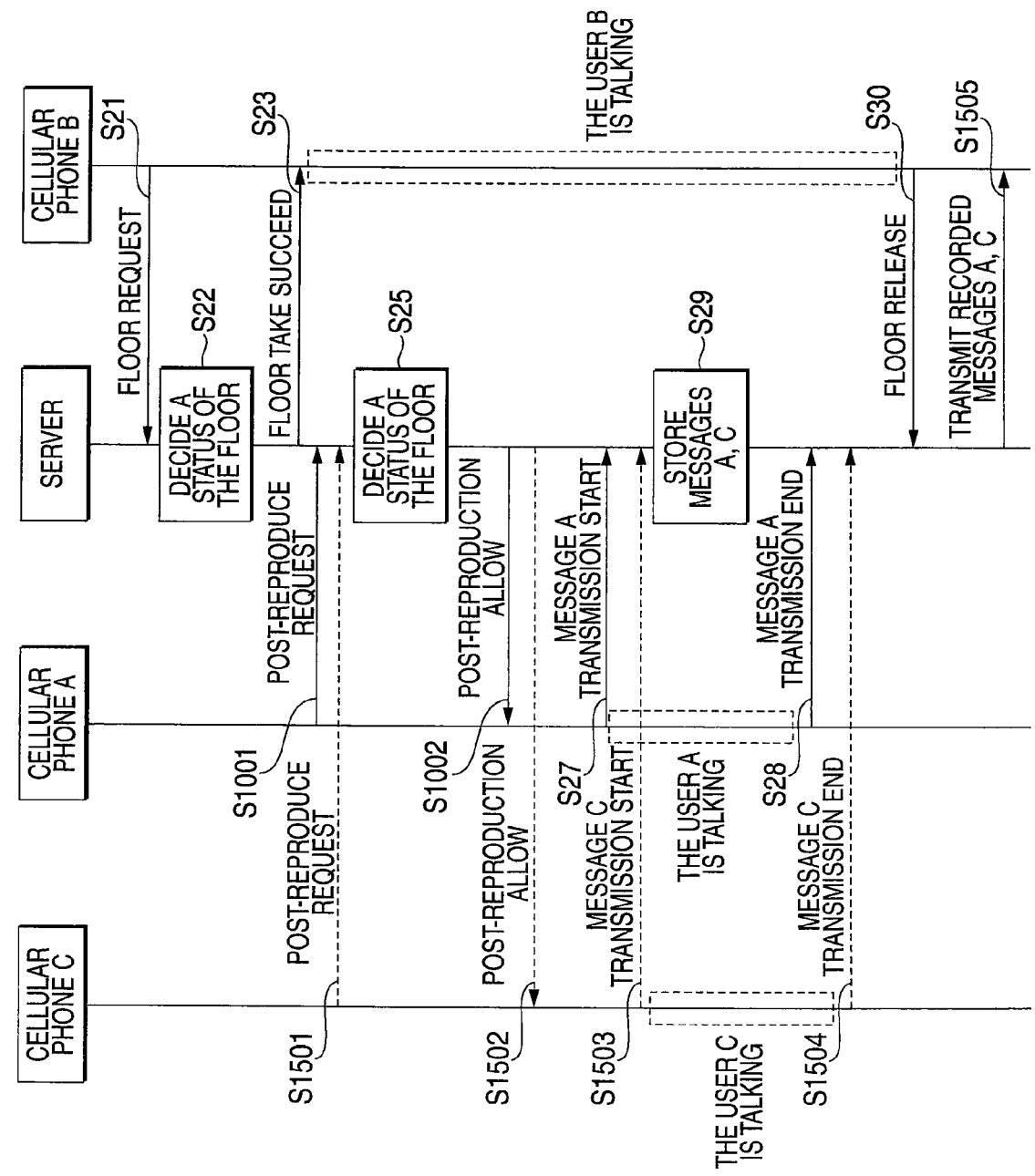
FIG. 15 Another example of the outline of the sequence in the talking system according to the third embodiment of the present invention.
Figure 16:
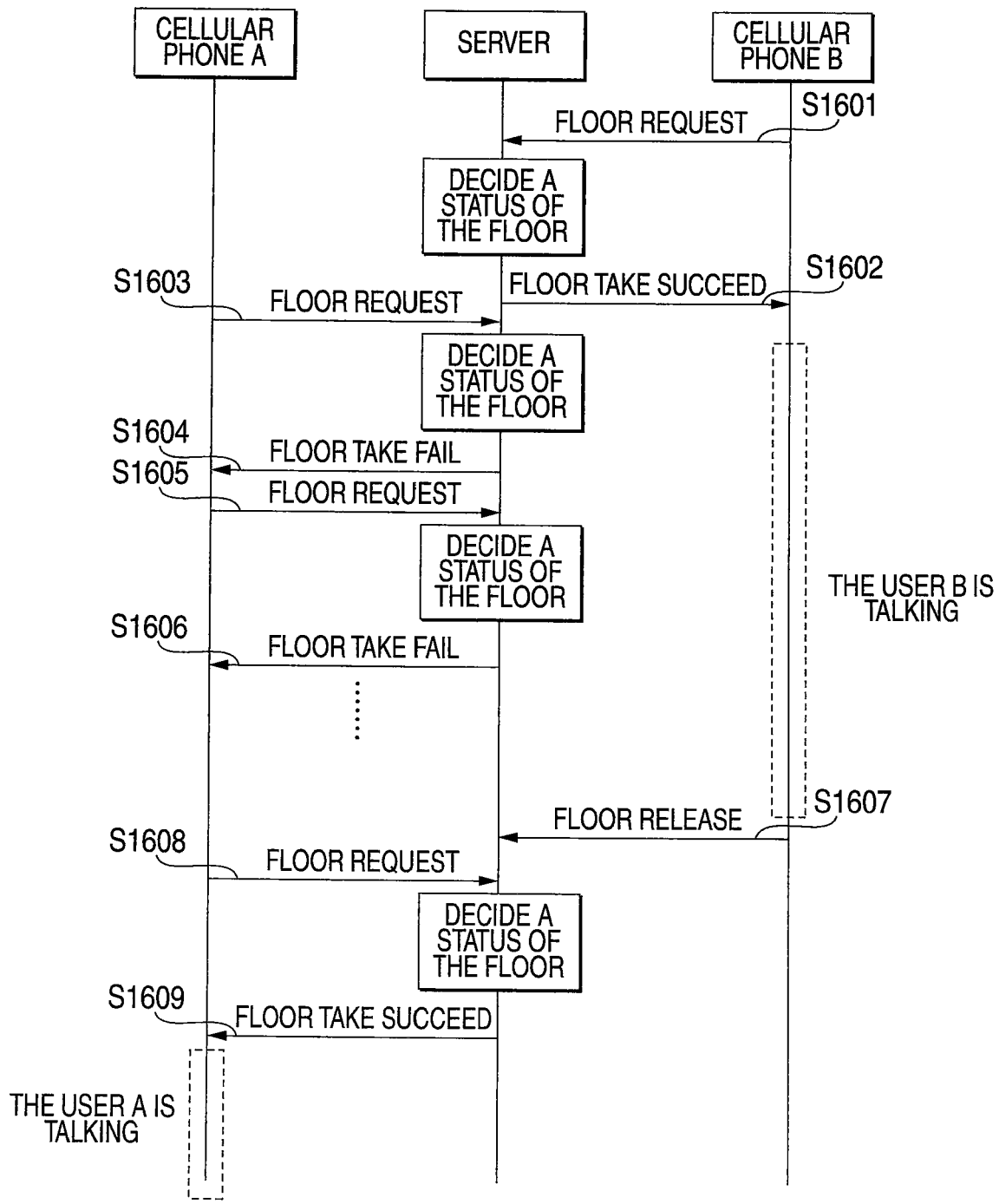
FIG. 16 An example of a sequence in a system constructed by cellular phones and a server in the prior art.
Figure 17:
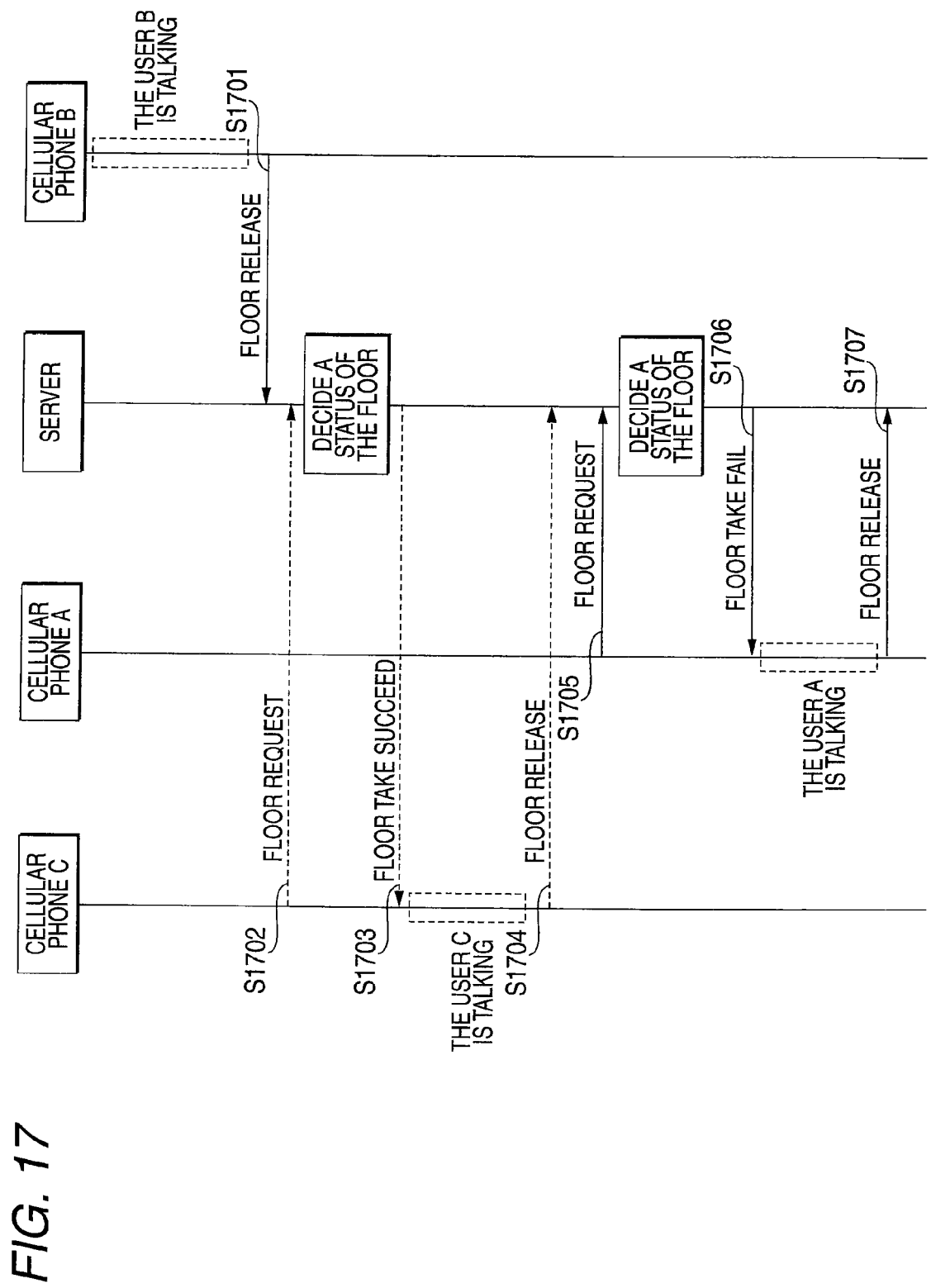
FIG. 17 Another example of the sequence in the system constructed by cellular phones and a server in the prior art.

In the third embodiment, the case where the number of the users who do the PoC talking is two is explained. In this case, even though the number of users who attend one PoC talking is increased, following steps may be taken, as shown in another example of the outline of the sequence in the talking system according to the third embodiment of the present invention shown in FIG. 15. That is, the post-reproduced message is recorded in the cellular phones (the post-reproduce request and the post-reproduce allow are handled in respective cellular phones A, B by the processes in steps S1001, S1501 and steps S1002, S1502) to which the floor has not granted respectively (the voice is recorded in a period of time encircled by a dotted line from step S27 to step S28 and a period of time encircled by a dotted line from step S1503 to step S1504 respectively). Then, the post-reproducing process can be executed by reproducing the recorded post-reproduced messages respectively (step S1505) after the cellular phone to which the floor is granted released the floor (step S30).

In this case, the process in the talking system according to the third embodiment of the present invention may be combined with the process in the talking system according to the second embodiment of the present invention. That is, following processes may be added to the processes in the floor managing portion 54 and the message managing portion 61.

(B5) When the floor managing portion 54 receives the floor request notice requesting that the floor should be granted from the cellular phone by the floor management information receiving portion 51 until a predetermined time has elapsed after it received the floor release notice from the message managing portion 61 in (B4), it controls the floor management information transmitting portion 52 to transmit the floor grant notice informing that the floor was granted to the cellular phone, and controls the floor status store buffer 53 to update a status of the floor to the "Floor Grant". Also, the floor managing portion 54 informs the PoC talking managing portion 57 that the floor was granted to the concerned cellular phone. Subsequently, the floor managing portion 54 performs the managements described in (B2) to (B4), (B7).

(B6) When a predetermined time has elapsed while the floor managing portion 54 does not receive the floor request notice after it accepted the floor release notice from the message managing portion 61 in (B4), the floor managing portion 54 informs the message managing portion 61 of the floor idle notice informing that there is no cellular phone to which the floor is granted. When the floor managing portion 54 transmitted the instruction to record the post-reproduced message to a certain cellular phone in (B2), it informs the message managing portion 61 of the floor grant notice informing that the floor is granted to the concerned cellular phone. Subsequently, the floor managing portion 54 performs the management described in (B4).

(C2') When the message managing portion 61 is informed of the floor idle notice informing that there is no cellular phone to which the floor is granted by the floor managing portion 54, it informs the floor managing portion 54 of the floor request notice requesting that the floor should be granted to the cellular phone that is identified by the identification information corresponding to the post-reproduced message that has not been reproduced yet (preferably the older one of the recorded post-reproduced messages should be selected sequentially) out of the identification information stored in the message store buffer 59. When the message managing portion 61 accepts the floor grant notice informing that the floor was granted to the concerned cellular phone from the floor managing portion 54, it controls the stored message acquiring portion 60 to cause the voice data transmitting portion 56 to transmit the post-reproduced message read from the message store buffer 59 to the cellular phones except the concerned cellular phone. Subsequently, the message managing portion 61 performs the management described in (C3).

As described above, according to the talking system according to the third embodiment of the present invention, the user of the cellular phone can do the talking irrespective of whether the floor is granted to the cellular phone or not, i.e., the user can do the talking with the other cellular phone to which the floor is not granted during a period of time the floor is granted to the user's own cellular phone, while the user can cause the server to record the talking contents once during a period of time the floor is not granted to the user's own cellular phone and then can reproduce the recorded talking contents toward other cellular phones after the cellular phone to which the floor is granted released this floor. Therefore, the user who is attending the PoC talking can talk at a desired timing.

Also, according to the talking system according to the first embodiment of the present invention, as shown in FIG. 10 and FIG. 11, the voice data transmitted from the cellular phone can be specified as the voice data for the talking via the PoC talking or the voice data used to record the post-reproduced message by utilizing the newly set control signal as the discriminating condition. Therefore, although the user of the cellular phone does not check a current status of the floor every time he or she starts the talking, the cellular phone can switch automatically the talking via the PoC talking and the talking used to record the post-reproduced message. As a result, conveniences in the PoC talking process and the post-reproducing process can be improved.

The present invention is explained in detail with reference to the particular embodiments, but it is apparent for those skilled in the art that various variations and modifications can be applied without departing from a spirit and a scope of the present invention.

This application is based upon Japanese Patent Application (Patent Application No. 2005-204584) filed on Jul. 13, 2005; the entire contents of which are incorporated herein by reference.

INDUSTRIAL APPLICABILITY

The phone terminal, the server, the talking system having the phone terminals and the server, and the talking method of the present invention possess such an advantage that the user who is attending the PoC talking can talk at a desired timing, and is useful to the phone terminal used to do the PoC talking, the server utilized in the PoC talking, and the talking system having the phone terminals and the server.

The invention claimed is:

1. A server for managing talking between a plurality of phone terminals, comprising:
    a floor managing portion that grants a floor to a first phone terminal based upon a first floor request received from the first phone terminal;
    a server receiving portion that receives, during a time period when the floor is granted to the first phone terminal, first voice data from the first phone terminal that is granted the floor and second voice data from a second phone terminal that is not granted the floor;
    a storing portion that stores the second voice data from the second phone terminal that is not granted the floor as a first recorded message; and
    a server transmitting portion that transmits the first voice data and the first recorded message,
    wherein the server transmitting portion transmits the first voice data to remaining phone terminals in the plurality of phone terminals other than the first phone terminal during the time period when the floor is granted to the first phone terminal and transmits the first recorded message to remaining phone terminals in the plurality of phone terminals other than the second phone terminal after releasing the floor from the first phone terminal to which the floor has been granted,
    wherein the storing portion stores the first recorded message from the second phone terminal with identification information used to identify the second phone terminal,
    wherein the storing portion stores the first recorded message when a number of recorded messages stored by the storing portion for the second phone terminal is less than a predetermined number of recorded messages for the second phone terminal specified by the identification information, wherein respective predetermined numbers of recorded messages for the plurality of phone terminals are set for the plurality of phone terminals and specified by respective identification information,
    wherein the server transmitting portion inhibits transmission of the first recorded message to the second phone terminal when transmitting the first recorded message to the remaining phone terminals in the plurality of phone terminals other than the second phone terminal, and
    wherein the server transmitting portion reads the identification information stored with the first recorded message, identifies the second phone terminal from the identification information, and inhibits transmission of the first recorded message to the second phone terminal as identified from the identification information.

2. The server according to claim 1, wherein the server receiving portion receives third voice data from a third phone terminal that is not granted the floor,
    wherein the storing portion stores the third voice data from the third phone terminal that is not granted the floor as a second recorded message,
    wherein the floor managing portion determines whether a predetermined amount of time has elapsed subsequent to an end of transmission of the first recorded message without reception of a second floor request, and
    wherein the server transmitting portion transmits the second recorded message when the predetermined amount of time subsequent to the end of transmission of the first recorded message without reception of the second floor request is determined to have elapsed.

3. The server according to claim 1, wherein the server transmitting portion transmits the first voice data during the time period when the floor is granted to the first phone terminal employing push-to-talk over cellular (PoC), and wherein the server transmitting portion transmits the first recorded message after the time period when the floor is granted to the first phone terminal employing recorded message reproduction.

4. The server according to claim 2, wherein the server transmitting portion transmits the first recorded message prior to the second recorded message when the first recorded message is stored by the storing portion at an earlier time compared to a time when the second recorded message is stored by the storing portion.

5. The server according to claim 1, wherein the storing portion inhibits storing the first recorded message when the number of recorded messages stored by the storing portion for the second phone terminal is equal to or greater than the predetermined number of recorded messages for the second phone terminal.

6. The server according to claim 1, wherein the server receiving portion receives the second voice data from the second phone terminal during the time period when the floor is granted to the first phone terminal after the floor managing portion denies the floor to the second phone terminal.

7. The server according to claim 1, wherein the floor managing portion releases the floor from the first phone terminal based upon a floor release notice received from the first phone terminal to end the time period when the floor is granted to the first phone terminal.

8. The server according to claim 7, wherein the floor managing portion grants the floor to the second phone terminal after releasing the floor from the first phone terminal when the first recorded message is determined to be stored in a message store buffer of the server.

9. A talking method using a server which is able to grant a floor to any one of a plurality of phone terminals, comprising:
receiving a floor request from a first phone terminal;
granting a floor to the first phone terminal based upon the floor request received from the first phone terminal;
receiving first voice data from the first phone terminal during a time period when the floor is granted to the first phone terminal;
receiving second voice data from a second voice terminal during the time period when the floor is granted to the first phone terminal;
storing the second voice data from the second phone terminal as a first recorded message;
storing the first recorded message from the second phone terminal with identification information used to identify the second phone terminal;
storing the first recorded message when a number of recorded messages stored for the second phone terminal is less than a predetermined number of recorded messages for the second phone terminal specified by the identification information, wherein respective predetermined numbers of recorded messages for the plurality of phone terminals are set for the plurality of phone terminals and specified by respective identification information;
transmitting the first voice data to remaining phone terminals in the plurality of phone terminals other than the first phone terminal during the time period when the floor is granted to the first phone terminal;
transmitting the first recorded message to remaining phone terminals in the plurality of phone terminals other than the second phone terminal after releasing the floor from the first phone terminal to which the floor has been granted; and
inhibiting transmission of the first recorded message to the second phone terminal when transmitting the first recorded message to the remaining phone terminals in the plurality of phone terminals other than the second phone terminal by reading the identification information stored with the first recorded message, identifying the second phone terminal from the identification information, and inhibiting transmission of the first recorded message to the second phone terminal as identified from the identification information.

* * * * *